US010209965B1

(12) United States Patent
Bienkowski et al.

(10) Patent No.: US 10,209,965 B1
(45) Date of Patent: Feb. 19, 2019

(54) IN-LINE FUNCTION SYNCHRONIZATION

(71) Applicant: The MathWorks, Inc., Natick, MA (US)

(72) Inventors: Joseph R. Bienkowski, Ashland, MA (US); Santosh C. Kasula, Westborough, MA (US); Andrew T. Campbell, Medway, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/625,149

(22) Filed: Feb. 18, 2015

(51) Int. Cl.
*G06F 9/44* (2018.01)
*G06F 8/34* (2018.01)
*G06F 11/36* (2006.01)

(52) U.S. Cl.
CPC ............ *G06F 8/34* (2013.01); *G06F 11/3688* (2013.01)

(58) Field of Classification Search
CPC .......... G06F 8/33; G06F 8/34; G06F 11/3688; G06F 11/3692
USPC .................................................. 717/106–119
See application file for complete search history.

(56) References Cited

U.S. PATENT DOCUMENTS 6,931,385 B1 * 8/2005 Halstead ............... G06F 3/0481 706/11
7,415,714 B2 * 8/2008 Chapman ................. G09B 7/02 715/781

OTHER PUBLICATIONS

Nils-Holger Nagele, “Knockout—Knock you out”, Jan. 2014, retrieved from http://nilsnaegele.com/codeedge/knockoutjs1.html, 106 pages.*
James H. Cross II et al., “Scalable Visualizations to Support Reverse Engineering: A Framework for Evaluation”, 1998, IEEE, pp. 201-209.*
Tichy, “Code Folding—User Interface Specification”, 2012, retrieved from http://ui.netbeans.org/docs/ui/code_folding/cf_uispec.html, 4 pages.*
JSFiddle , “Introduction—jsFiddle 0.5a2 documentation”, Mar. 2014, retrieved in https://web.archive.org/web/20140322124738 from http://doc.jsfiddle.net/basic/introduction.html , 4 pages.*
Stack Overflow, “How do I just Save a jsFiddle and not get a new version”, Mar. 2014, retrieved in https://web.archive.org/web/20140314141114 from https://stackoverflow.com/questions/5841818/how-do-i-just-save-a-jsfiddle-and-not-get-a-new-version , 2 pages.*
Stuart McGarrity, “Introduction to Obiect-Oriented Programmingin MATLAB®”, 2009, The MathWorks, Inc., 6 pages.*

(Continued)

*Primary Examiner* — Ted T. Vo
(74) *Attorney, Agent, or Firm* — Harrity & Harrity, LLP

(57) ABSTRACT

A device may provide, via a code editor window of a user interface, program code that includes a reference. The reference may call a portion of program code. The portion of program code may be associated with a source of the portion of program code. The device may determine the portion of program code based on the reference. The device may provide the portion of program code, in-line with the program code, via the code editor window of the user interface. The device may receive a modification to the portion of program code via the code editor window of the user interface. The device may synchronize the modification to the portion of program code with the source of the portion of program code. The device may create a modified copy of the source of the portion of program code based on the synchronizing.

20 Claims, 24 Drawing Sheets

(56) References Cited

OTHER PUBLICATIONS

Andreano Lanusse, "Everything PHP Developers Need to Be Productive", Feb. 2009, Embarcadero Technologies, 19 pages.*
Excessive, "CodeGear Delphi 2007 Review", 2007, Retrieved from https://excessive.wordpress.com/2007/06/12/codegear-delphi-2007-review/ , 16 pages.*
Brackets, "Brackets: A modern, open source text editor that understands web design," http://brackets.io/, Nov. 4, 2014, 6 pages.

* cited by examiner

TECHNICAL COMPUTING ENVIRONMENT (TCE)

File  Edit  Tools  View  Evaluate  Execute  Debug  Help

Code Editor Window

```
complexAlg(10, 20)
function complexAlg(in1, in2)  ⎯ 435
    x = in1 * 8
    y = in2 * 3 + 2
    comp = compare(x, y)
    print(comp)
end
         445
```

Code Evaluation Window

```
x = 80
y = 62  ⎯ 440
x wins!
comp = 'x wins!'
```

400

TECHNICAL COMPUTING ENVIRONMENT (TCE)

File  Edit  Tools  View  Evaluate  Execute  Debug  Help

Code Editor Window

```
complexAlg(10, 20)
function complexAlg(in1, in2)
    x = in1 * 8
    y = in2 * 3 + 2
450—  comp = compare(x, y)
    function out = compare(x, y)
        if x > y
            return 'x wins!'
        else
            return 'y wins!'
        end
    print(comp)
end
```

Code Evaluation Window

```
x = 80
y = 62
x wins!
comp = 'x wins!'
```

TECHNICAL COMPUTING ENVIRONMENT (TCE)

File  Edit  Tools  View  Evaluate  Execute  Debug  Help

Code Editor Window

```
complexAlg(10, 20)
function complexAlg(in1, in2)
    x = in1 * 8
    y = in2 * 3 + 2
    comp = compare(x, y)
    function out = compare(x, y)
        if x > y
            return 'x is greater'
        else
            return 'y is greater'
        end
    print(comp)
end
```

455~

Code Evaluation Window

```
x = 80
y = 62
x is greater
comp = 'x is greater'
```

TECHNICAL COMPUTING ENVIRONMENT (TCE)

File  Edit  Tools  View  Evaluate  Execute  Debug  Help

Code Editor Window

```
otherAlg(5, 15)
    function complexAlg(in1, in2)
        x = in1 * 2
        y = in2 + 8
465─▢  comp = compare(x, y)
460     function out = compare(x, y)
            if x > y
                return 'x is greater'
            else
                return 'y is greater'
            end
        print(comp)
    end
```

Code Evaluation Window

```
x = 10
y = 23
y is greater
comp = 'y is greater'
```

TECHNICAL COMPUTING ENVIRONMENT (TCE)

File  Edit  Tools  View  Evaluate  Execute  Debug  Help

Code Editor Window

```
complexAlg(10, 20)
function complexAlg(10, 20)
    x = 10 * 4
    y = 20 * 3 + 2
    comp = compare(x, y)
    print(comp)
end
```

520
510  530

Code Evaluation Window

```
x = 40
y = 62
y wins!
comp = 'y wins!'
```

500

TECHNICAL COMPUTING ENVIRONMENT (TCE)

File  Edit  Tools  View  Evaluate  Execute  Debug  Help

Code Editor Window

```
complexAlg(10, 20)
function complexAlg(in1, in2)
    x = in1 * 4
    y = in2 * 3 + 2
    comp = compare(40, 62)      ⎯540
    function out = compare(40, 62)
        if 40 > 62
            return 'x wins!'
        else
            return 'y wins!'
        end
    print(comp)
end
```

Code Evaluation Window

```
x = 40
y = 62
y wins!
comp = 'y wins!'
```

TECHNICAL COMPUTING ENVIRONMENT (TCE)

File  Edit  Tools  View  Evaluate  Execute  Debug  Help

Code Editor Window

```
%% Test1 code    T₁
complexAlg(10,20)
assert(display == 'y wins!')

%% Test2 code    T₂
complexAlg(20,10)
assert(display == 'y wins!')

%% Test3 code    T₃
compare(2,4)
assert(out == 'y wins!')

%% Test4 code    T₄
compare(4,2)
assert(out == 'x wins!')
```

Code Evaluation Window

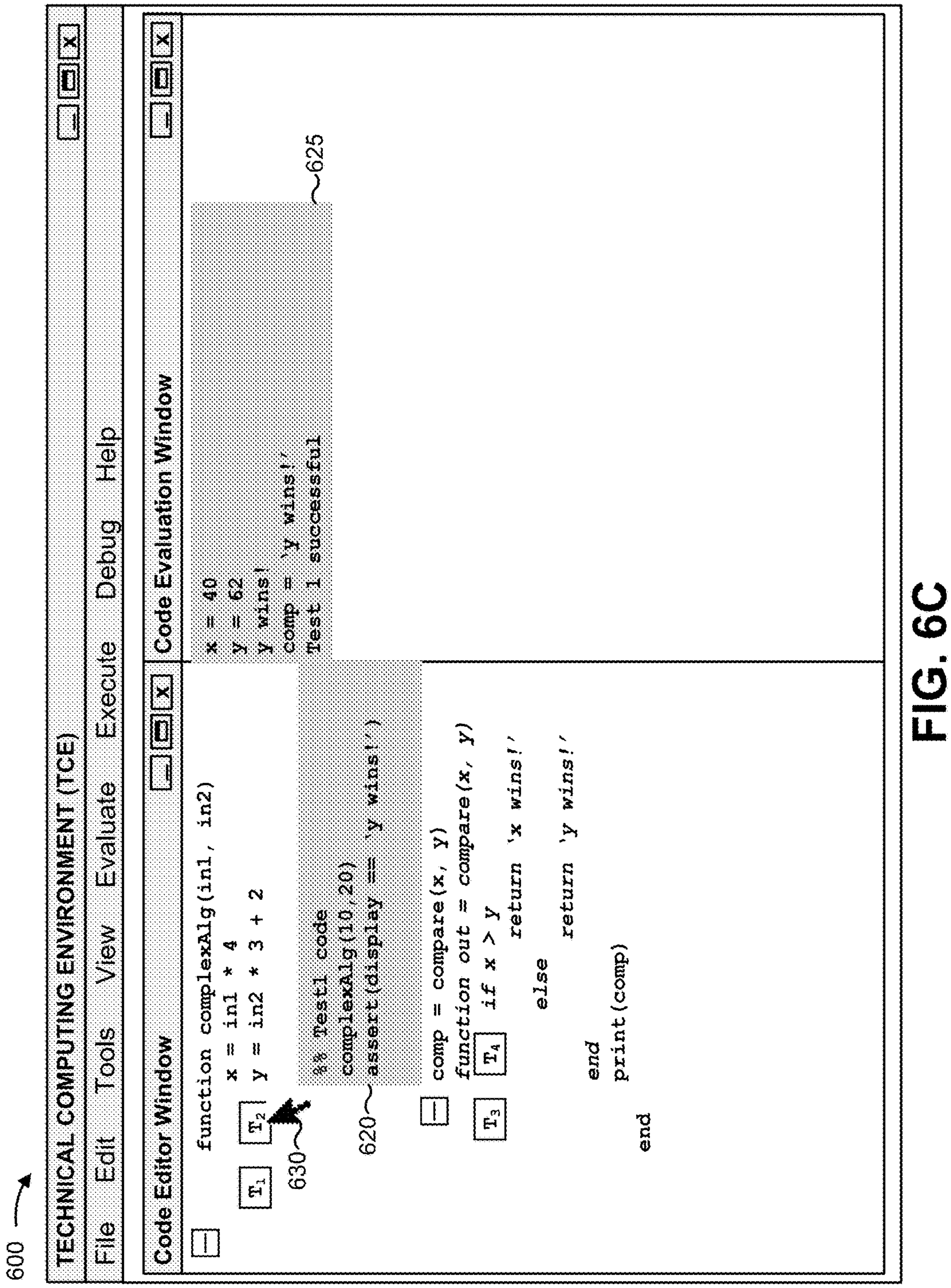

FIG. 6C

Technical Computing Environment (TCE) — 600

File  Edit  Tools  View  Evaluate  Execute  Debug  Help

Code Editor Window

```
function complexAlg(in1, in2)
    x = in1 * 4
    y = in2 * 3 + 2
    %% Test1 code
    complexAlg(10,20)
    assert(display == 'y wins!')

    comp = compare(x, y)
function out = compare(x, y)
    if x > y
        return 'x wins!'
    else
        return 'y wins!'
    end
    print(comp)
end
```

T₁, T₂, T₃, T₄ — 620, 630

Code Evaluation Window

```
x = 40
y = 62
y wins!
comp = 'y wins!'
Test 1 successful
```
— 625

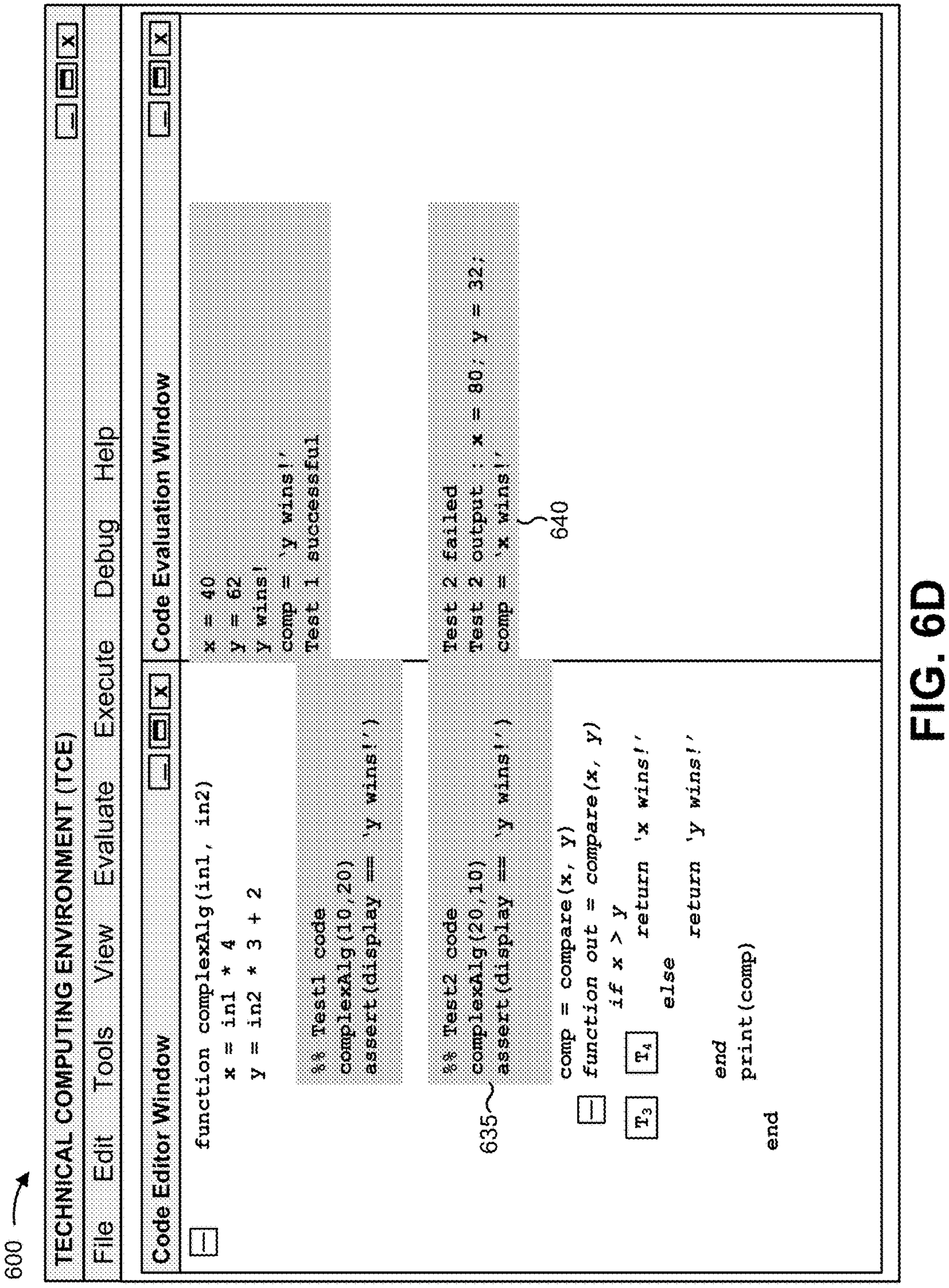

FIG. 6D

```
TECHNICAL COMPUTING ENVIRONMENT (TCE)
File   Edit   Tools   View   Evaluate   Execute   Debug   Help
```

Code Editor Window

```
function complexAlg(in1, in2)
    x = in1 * 4
    y = in2 * 3 + 2

    %% Test1 code
    complexAlg(10,20)
    assert(display == 'y wins!')

    %% Test2 code
    complexAlg(20,10)
    assert(display == 'y wins!')

    comp = compare(x, y)
    function out = compare(x, y)
        if x > y
            return 'x wins!'
        else
            return 'y wins!'
    end
    print(comp)

end
```

635

T₃, T₄

Code Evaluation Window

```
x = 40
y = 62
y wins!
comp = 'y wins!'
Test 1 successful

Test 2 failed
Test 2 output : x = 80, y = 32;
comp = 'x wins!'
```

640

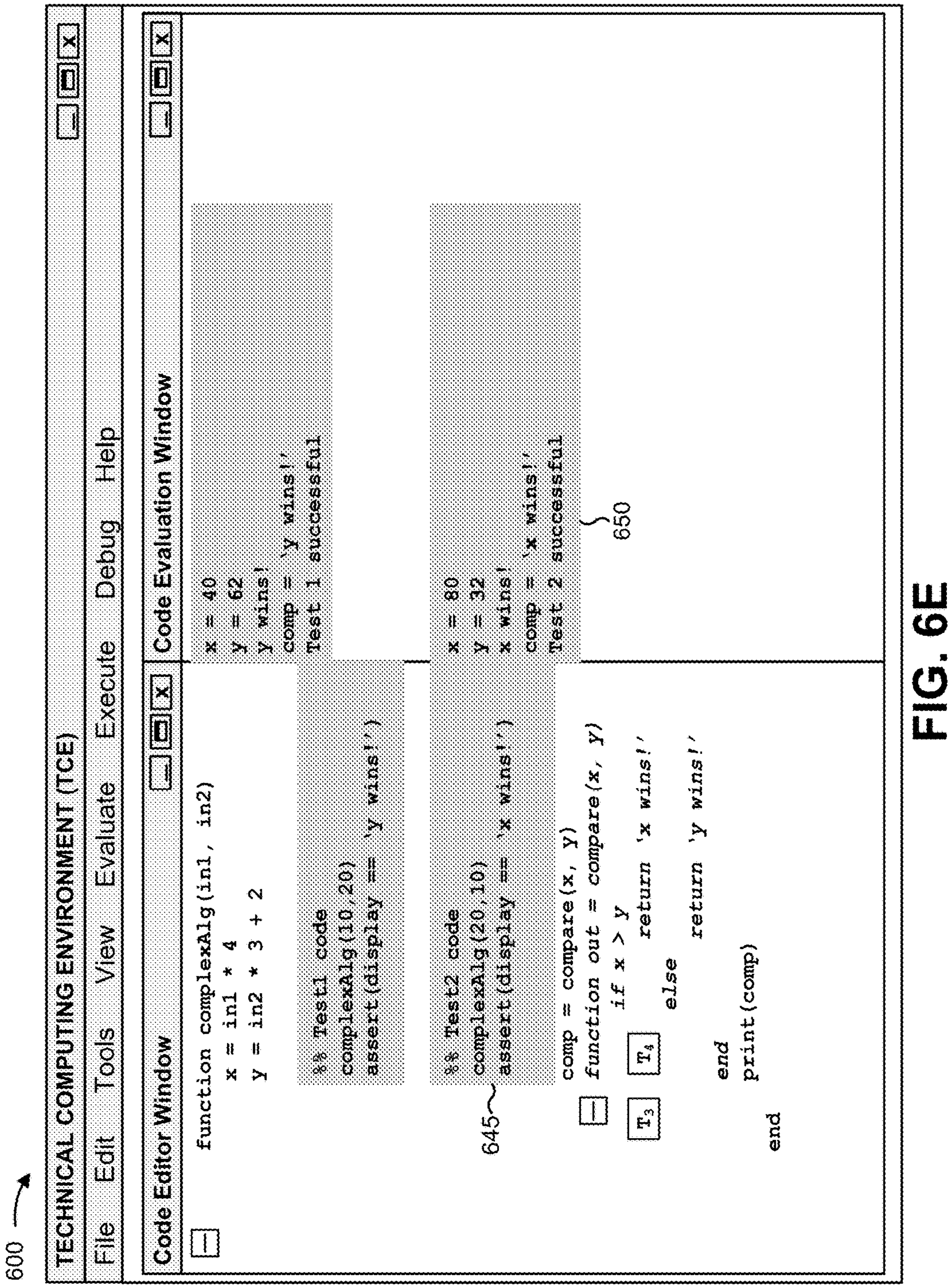

FIG. 6E

```
TECHNICAL COMPUTING ENVIRONMENT (TCE)
File  Edit  Tools  View  Evaluate  Execute  Debug  Help

Code Editor Window

function complexAlg(in1, in2)
    x = in1 * 4
    y = in2 * 3 + 2

    %% Test1 code
    complexAlg(10,20)
    assert(display == 'y wins!')

    %% Test2 code
    complexAlg(20,10)
    assert(display == 'x wins!')

    comp = compare(x, y)
    function out = compare(x, y)
        if x > y
            return 'x wins!'
        else
            return 'y wins!'
    end
    print(comp)
end

Code Evaluation Window

x = 40
y = 62
y wins!
comp = 'y wins!'
Test 1 successful

x = 80
y = 32
x wins!
comp = 'x wins!'
Test 2 successful
```

600, 645, 650, T₃, T₄

IN-LINE FUNCTION SYNCHRONIZATION

BRIEF DESCRIPTION OF THE DRAWINGS

FIGS. 6A-6G are diagrams of an example implementation of testing program code using in-line function synchronization;

DETAILED DESCRIPTION

Figure 1A:
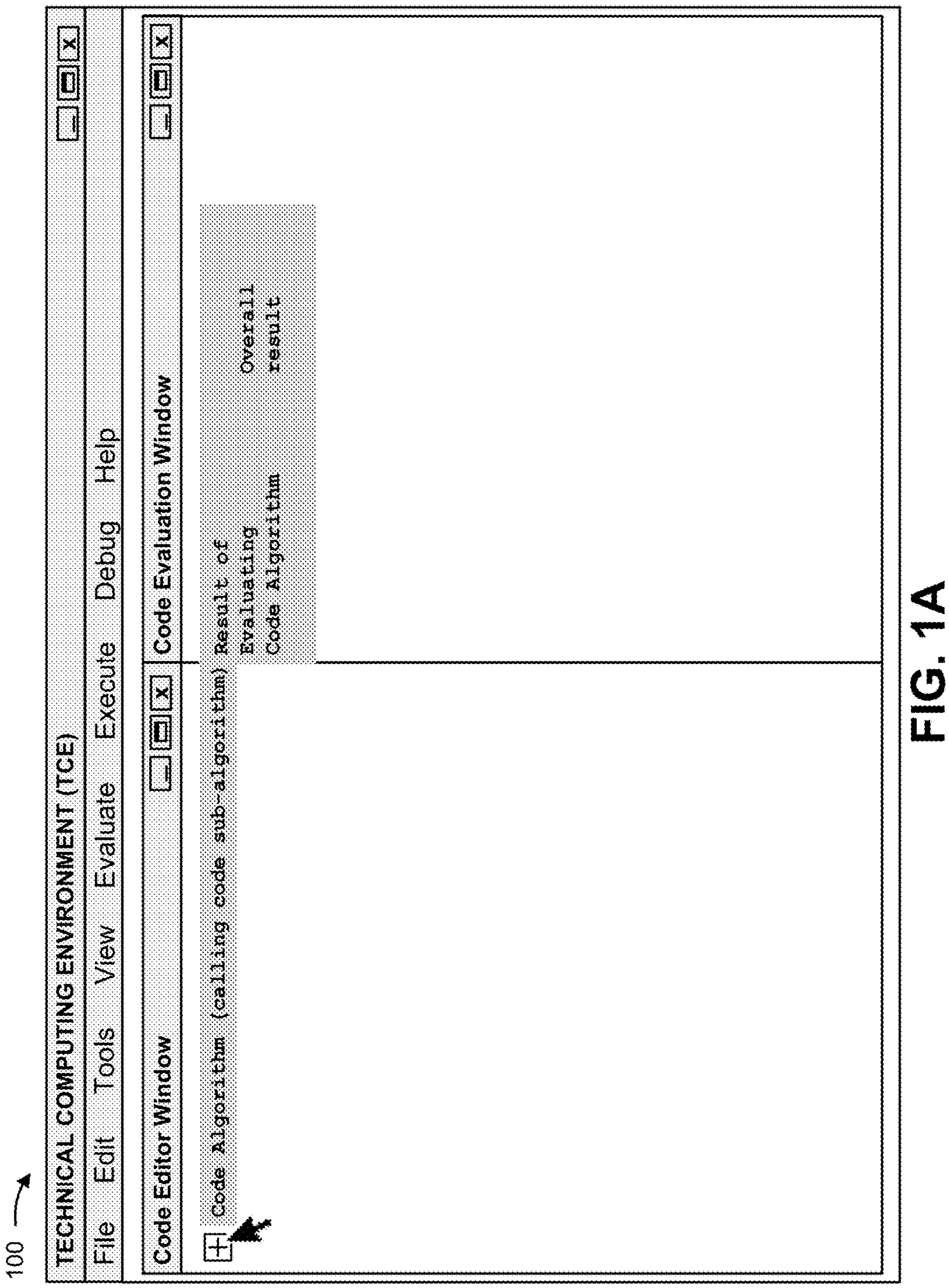
FIGS. 1A-1D are diagrams of an overview of an example implementation described herein.

The following detailed description of example implementations refers to the accompanying drawings. The same reference numbers in different drawings may identify the same or similar elements.

A user, such as a computer programmer, may create program code, and may cause a client device to execute the program code. The program code may include a reference that calls a portion of program code. A source of the portion of program code may be included in the program code (e.g., may be included at a location, in the program code, that is different than a location of the reference), or may be associated with another source, such as another file or batch of program code. The portion of program code may include a subroutine, a function, a variable, a class, a unit test, or the like. When the client device evaluates the program code, the client device may evaluate the portion of program code called by the reference. The client device may provide a result of evaluating the program code and the portion of program code.

The user may want to evaluate and/or modify the portion of program code. For example, the user may want to modify the function that the portion of program code causes the client device to perform, or may want to modify an input used by the portion of program code in association with the function. Additionally, or alternatively, the user may want to determine an intermediate output of the portion of program code, for evaluation purposes, testing purposes, debugging purposes, or the like. However, to evaluate and/or modify the portion of the program code, the user may be forced to access the source of the portion of program code. Accessing the source of the portion of program code may be inconvenient and cumbersome for the user (e.g., the user may need to use a different user interface, access a different file, access a different part of the program code, or the like). Because accessing the source of the portion of program code may be inconvenient, a change to the portion of program code may be prone to user error (e.g., because the user cannot easily view or understand the portion of program code in context with the reference in the program code that calls the portion of program code). The user may be forced to view the portion of program code separately from the reference that calls the portion of program code, which may disrupt the user's understanding of interactions between the program code and the portion of program code. Further, the user may not be capable of modifying the portion of program code via the user interface while viewing the program code (e.g., the user may be forced to access the source of the portion of program code to modify the portion of program code). Additionally, the portion of program code may be called by other references at other locations in the program code, which may cause further user error based on the change to the portion of program code affecting the other references.

Implementations described herein may assist the user in viewing and modifying the portion of program code, without accessing the source of the portion of program code, in context with the reference that calls the portion of the program code. Implementations described herein may provide for display, with the program code, the portion of program code (e.g., the portion of program code may be displayed where the reference is located in the program code). The client device may provide an input, an intermediate output, and/or an overall output of the portion of program code and/or the program code. In this way, implementations described herein may enable the client device to provide the program code and the portion of program code in a manner that facilitates understanding of interactions between the portion of program code and the program code.

Further, the user may modify the portion of program code that is displayed with the program code. A modification to the portion of program code that is displayed with the program code may cause the client device to modify the source of the portion of program code. In this way, the client device may facilitate easy and reliable modification of the portion of program code in context with the reference that calls the portion of program code, and may cause the modification to the portion of program code to affect other references that call the portion of program code (e.g., other references in the program code and/or in another, different program code).

FIGS. 1A-1D are diagrams of an overview of an example implementation 100 described herein. As shown in FIG. 1A, a client device may provide a code editor window of a user interface that permits a user to input, modify, and/or view program code. The client device may also provide a code evaluation window of the user interface that provides results of evaluating the program code. Assume the client device receives an interaction with an input mechanism, such as an "Evaluate" button provided via the user interface. Based on receiving the interaction, the client device may evaluate the program code provided in the code editor window, and may display results of evaluating the program code in the code evaluation window.

As further shown in FIG. 1A, program code (e.g., shown as "Code Algorithm") may include a reference that calls a portion of program code (e.g., shown as "calling code sub-algorithm"). The client device may provide one or more results of evaluating the program code (e.g., shown as "Overall Result"). The client device may provide the result via the code evaluation window of the user interface. As shown, assume that the client device receives an interaction with an input mechanism to cause the client device to provide the portion of program code that is called by the reference (e.g., via the "+" button to the left of "Code Algorithm").

Figure 1B:
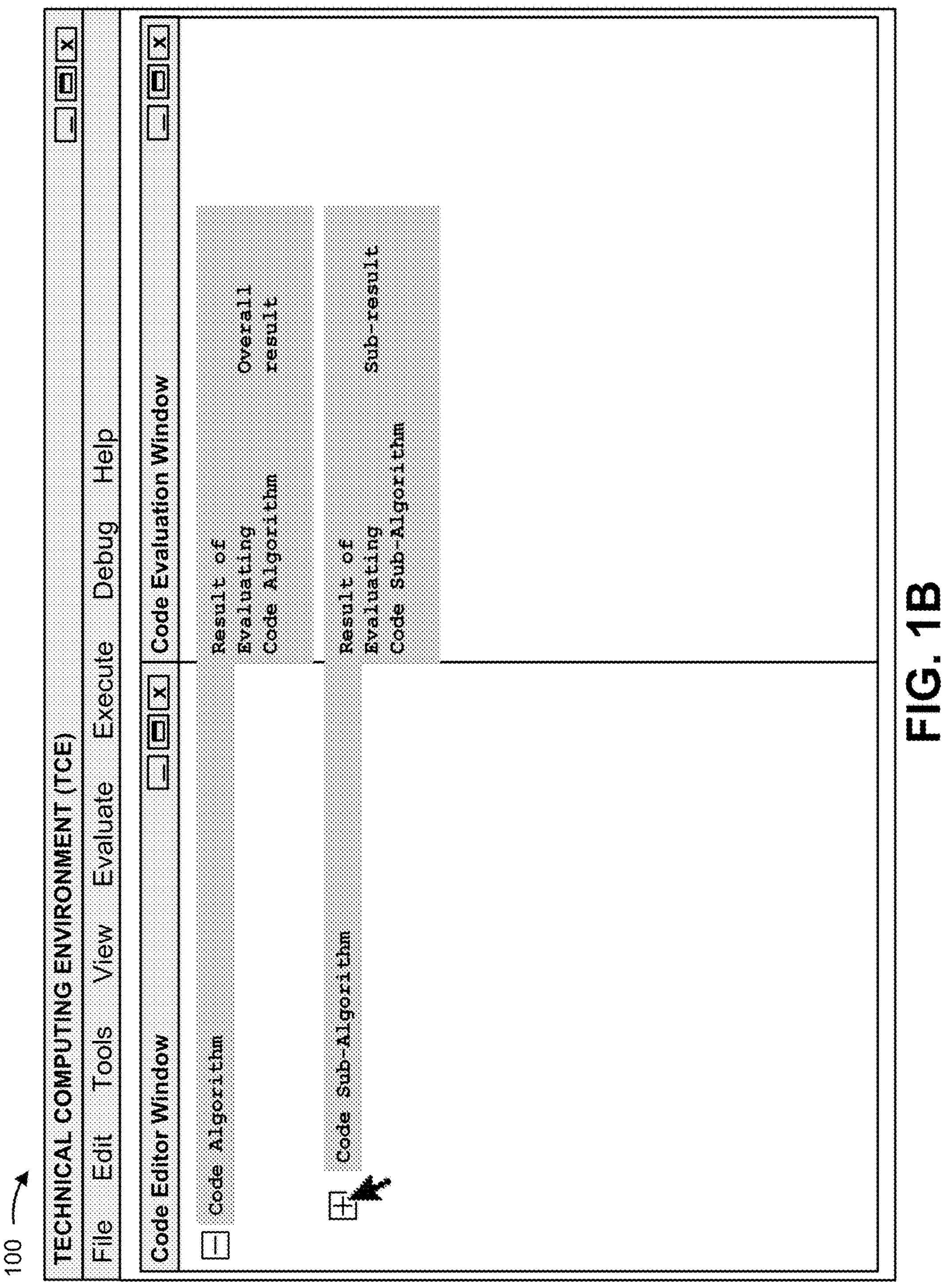

As shown in FIG. 1B, receiving the interaction may cause the client device to execute and/or provide, in-line with the program code, the portion of program code that is called by the reference. Here, "in-line" may indicate that the portion of program code is provided for display in association with the program code. For example, in-line may indicate that the program code and portion of program code reside at a common location, such as in a file. In-line may further indicate that the program code and the portion of program code are presented in a manner that indicates a hierarchical relationship between the program code and the portion of the program code. For example, the program code may be displayed to a left margin, and the portion of program code may be displayed indented from the left margin and in place of the reference within the program code that calls the portion of program code. As further shown, the client device may provide the result of executing the portion of program code (e.g., "Sub-result"). Assume that the portion of program code includes two operations (e.g., "Operation1" and "Operation2"). As shown, assume that the client device receives an interaction with an input mechanism to cause the client device to provide for display the two operations in association with the portion of program code (e.g., a "+" button associated with the code sub-algorithm).

Figure 1C:
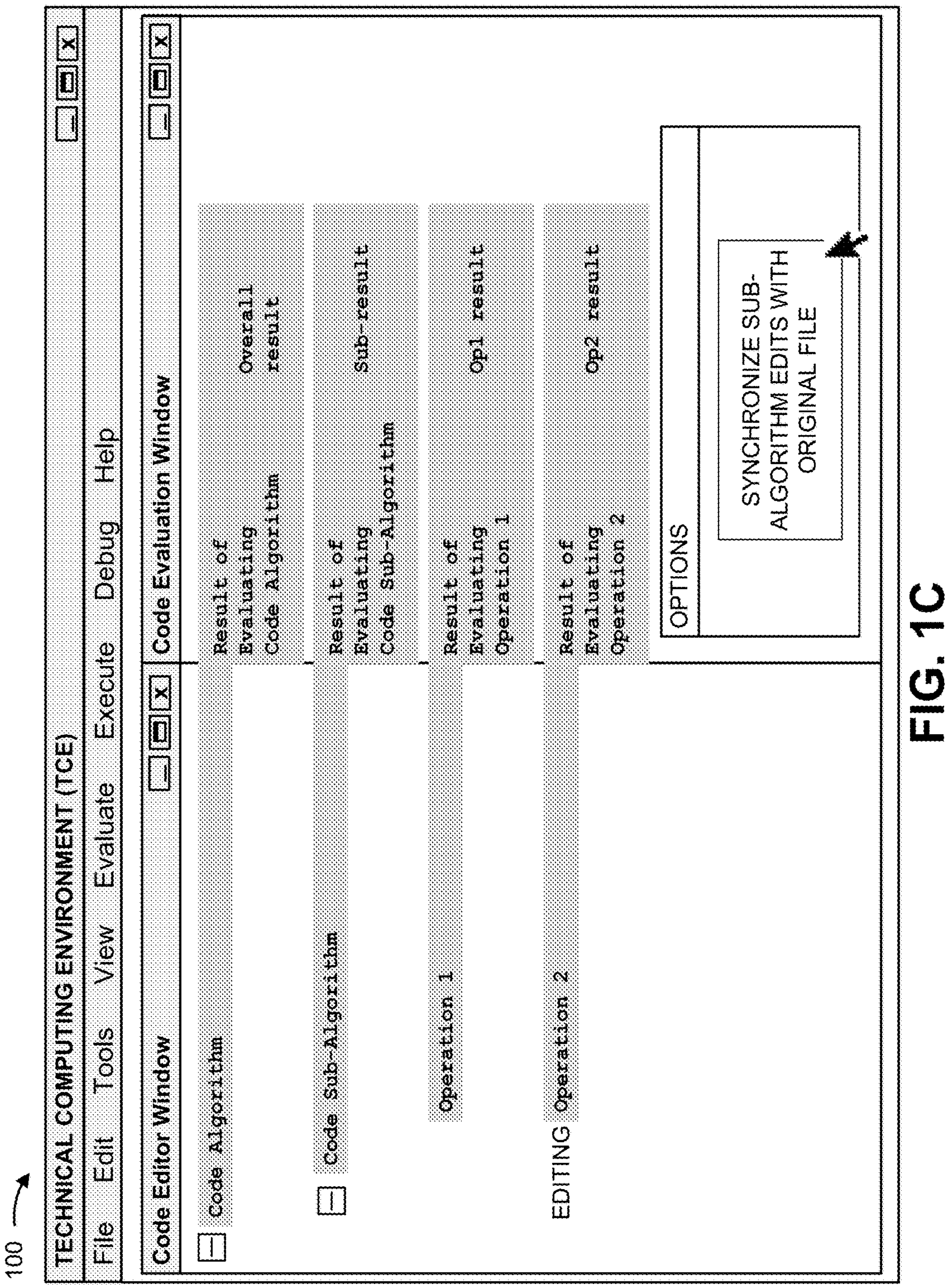

As shown in FIG. 1C, based on receiving the interaction, the client device may execute and/or provide, in-line with the portion of program code, the two operations associated with the portion of program code. The client device may further provide, via the code evaluation window of the user interface, one or more results determined by executing the two operations (e.g., "Op1 result" and "Op2 result"). As shown, assume that the client device receives a modification to the operation of the portion of program code identified as "Operation2" (e.g., a modification to a parameter of the operation, an output of the operation, or the like). As further shown, assume that the client device receives an interaction with an input mechanism to cause the client device to modify the source of the portion of program code based on the modification to the portion of program code (e.g., shown as a "synchronize sub-algorithm edits with original file" button).

Figure 1D:
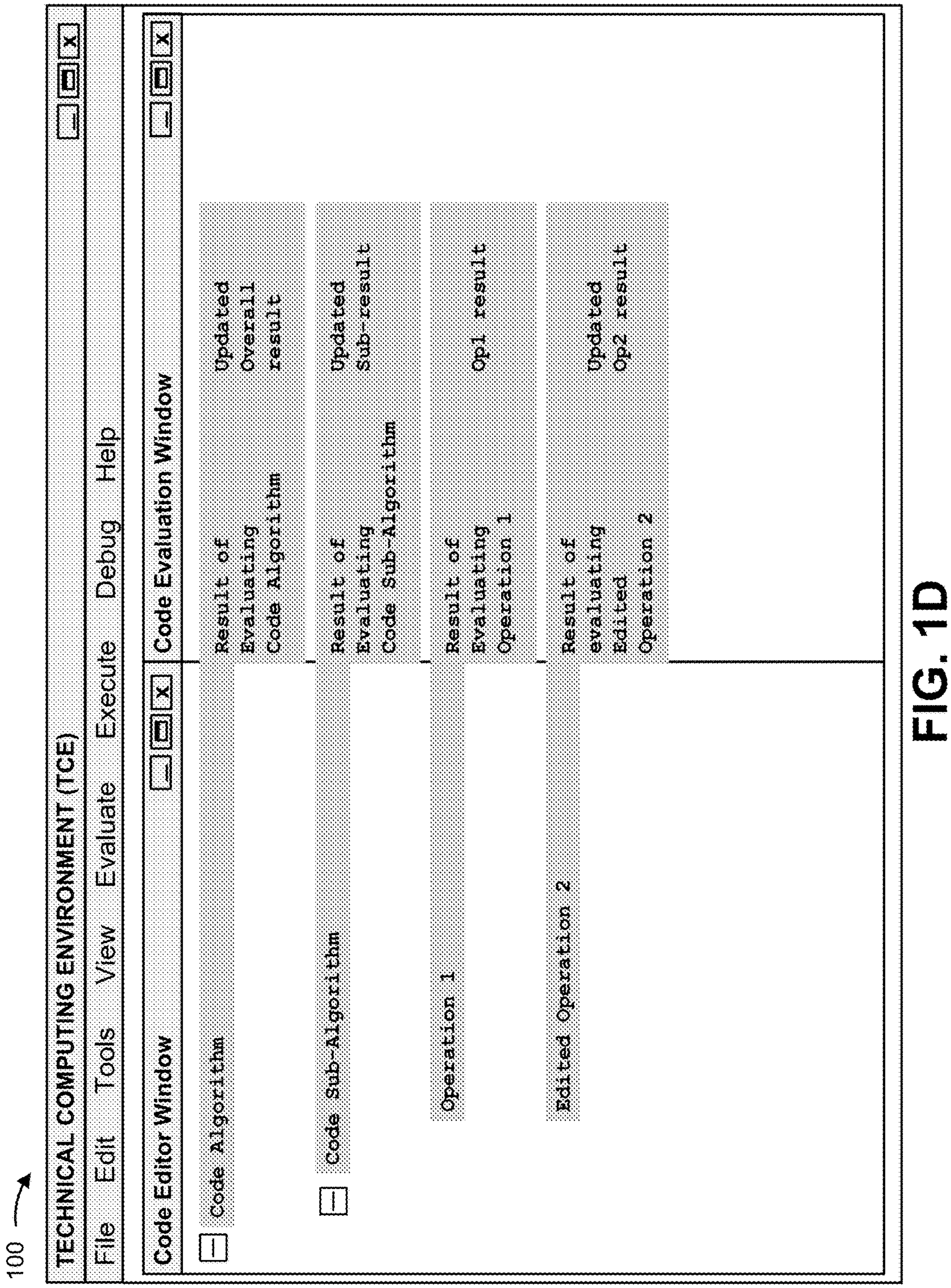

For the purpose of FIG. 1D, assume that the modification to Operation2 causes an output of Operation2, an output of Code sub-algorithm, and an output of Code Algorithm to change. Assume further that the output of Code sub-algorithm changes based on Operation2 being located, hierarchically, within Code sub-algorithm, and that the output of Code Algorithm changes based on Code sub-algorithm being located, hierarchically, within Code Algorithm. Assume further that the client device synchronizes the modification to the portion of program code with the source of the portion of program code. As shown in FIG. 1D, based on the modification to Operation2, the client device may provide, via the code evaluation window of the user interface, one or more updated results (e.g., shown as "Updated Overall Result," "Updated Sub-Result," and "Updated Op2 Result").

In this way, a client device may provide a portion of program code in-line with program code that includes a reference that calls the portion of program code. The client device may further display one or more results or outputs in association with the program code and/or the portion of program code (e.g., in-line with the program code and/or the portion of program code, and/or in a code evaluation window of a user interface). In this way, the client device may provide the portion of program code simultaneously with and in context with the program code, which may aid in evaluating, debugging, and writing the program code. The client device may receive a modification to the portion of program code that is provided in-line with the program code and an instruction to modify the source of the portion of program code based on the modification. By modifying the source of the portion of program code, the client device may cause the modification to affect any file containing a reference to the portion of program code. Additionally, or alternatively, the client device may receive the modification to the portion of program code and an indication to create a local copy of the source of the portion of program code that includes the modification. By creating the local copy of the source of the portion of program code, the client device may facilitate modifying and/or testing the portion of program code without modifying the source of the portion of program code.

Figure 2:
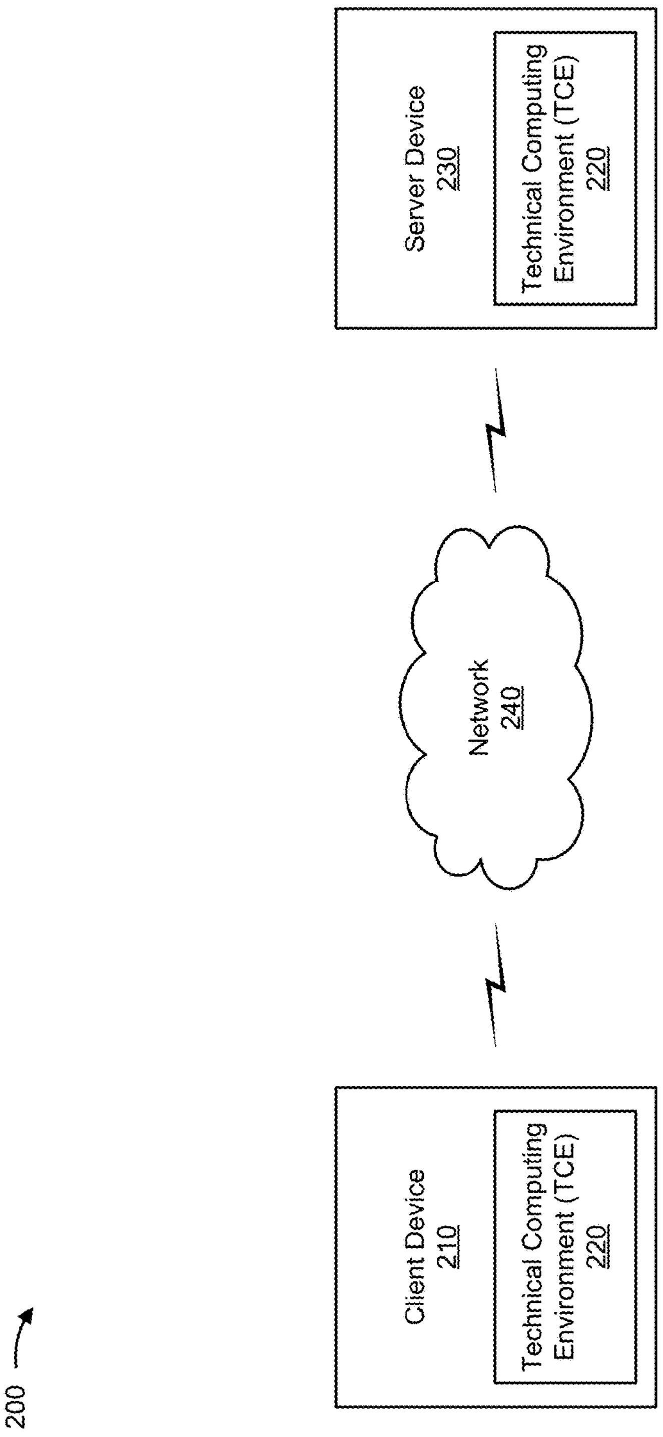
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive, generate, store, evaluate, and/or provide a portion of program code and/or information associated with a portion of program code (e.g., a reference that calls the portion of program code, a source of the portion of program code, a modification to the portion of program code and/or the source, or the like). In some implementations, client device 210 may receive information from and/or transmit information to server device 230 (e.g., program code, and/or information associated with program code).

Client device 210 may host TCE 220. TCE 220 may include any hardware-based component or a combination of hardware and software-based components that provides a computing environment that allows tasks to be performed (e.g., on behalf of users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor window that permits a user to input program code (e.g., textual program code, graphical program code, etc.). Additionally, or alternatively, TCE 220 may include a user interface that provides a code evaluation window that provides results corresponding to program code displayed in the code editor window. TCE 220 may provide one or more correspondence indicators that indicate a correspondence between different portions of program code and respective results associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
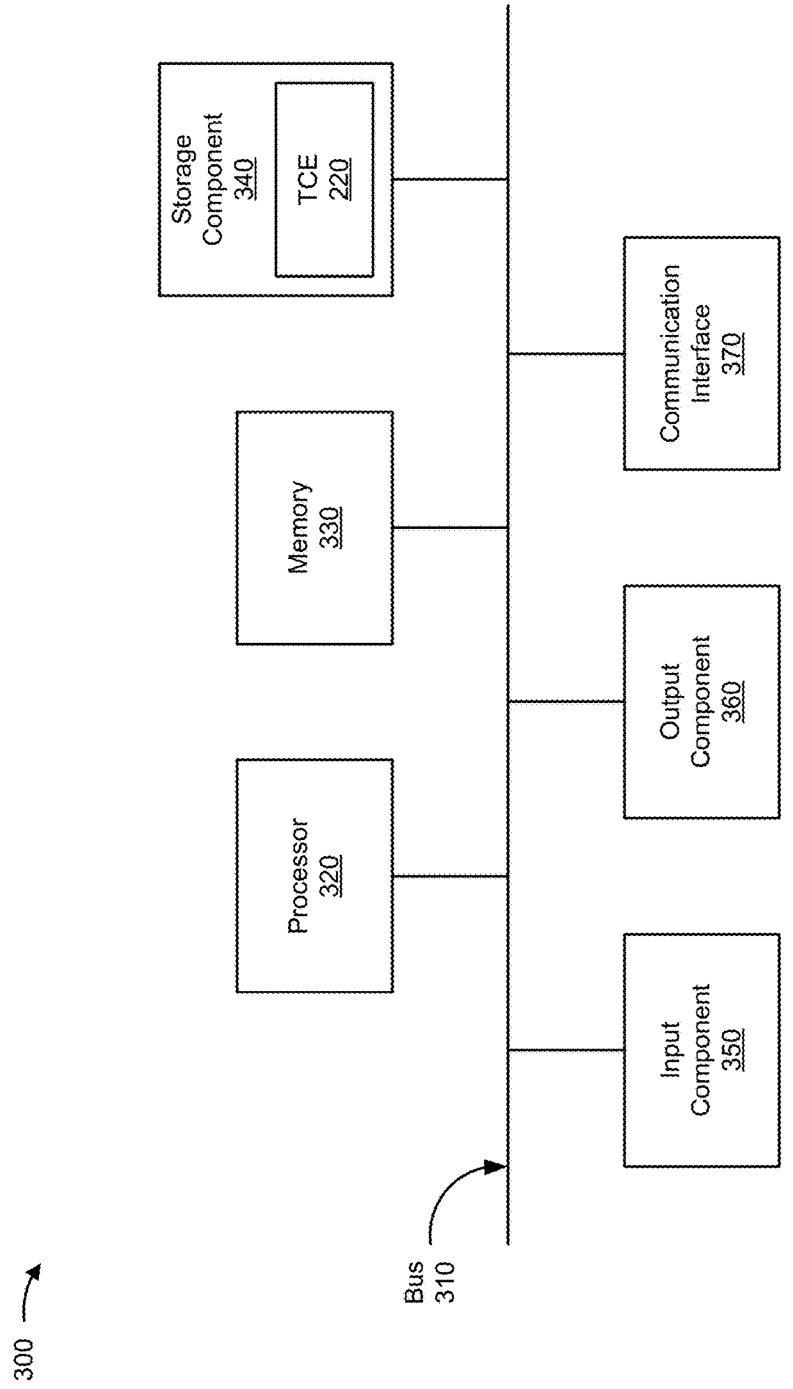
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4G are diagrams of an example implementation 400 of receiving and storing a modification to a portion of program code. For the purposes of FIGS. 4A-4G, portions of program code that are displayed in-line (e.g., based on a reference that calls the portion of program code), are displayed in FIGS. 4A-4G in italic typeface.

Figure 4A:
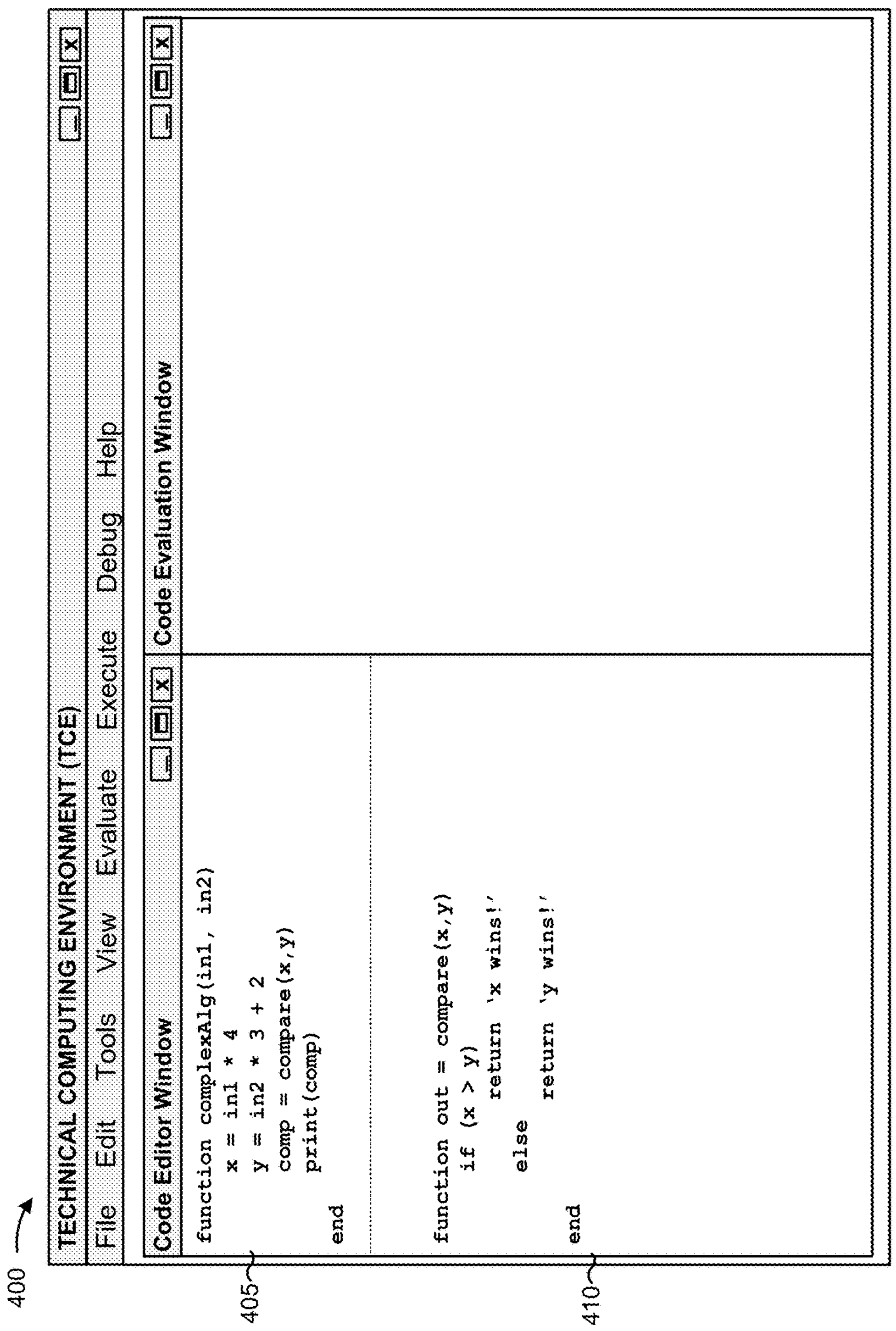
FIGS. 4A-4G are diagrams of an example implementation of receiving and storing a modification to a portion of program code.

As shown in FIG. 4A, and by reference number 405, assume that client device 210 receives the following program code via a code editor window of a user interface of TCE 220:

```
function complexAlg(in1, in2)
  x=in1*4
  y=in2*3+2
  comp=compare(x, y)
  print(comp)
end
```

The above program code defines a first function that accepts two inputs (here, the first function is complexAlg, and the inputs are in1 and in2). The first function determines a first value by applying a first operation to a value of in1 (here, the first value x is determined by applying the operation of in1*4), and determines a second value by applying a second operation to a value of in2 (here, the second value y is determined by applying the operation of in2*3+2). The first function includes a reference that calls a portion of program code (here, the reference is compare(x, y)) that accepts two inputs (here, the inputs are x and y) and determines an output of the portion of program code (here, the output is associated with the variable comp). The first function then provides, as an output, the value associated with the variable comp (here, the first function will print the output of the portion of program code).

The portion of program code may be associated with a source of the portion of program code. For the purpose of FIG. 4A, the source need not be received by client device 210 via the code editor window of the user interface. For example, the source may be associated with a different file, or may be determined by client device 210, TCE 220, another device, etc.

As shown by reference number 410, the source may define the following portion of program code:

```
function out=compare(x, y)
  if (x>y)
    return 'x wins!'
  else
    return 'y wins!'
end
```

The above portion of program code specifies a second function (here, the second function is compare, and the inputs are x and y). The second function compares a value of x and a value of y to determine which value is greater. If the value of x is greater than the value of y, the function returns the string 'x wins!'. Otherwise, the function returns the string 'y wins!'. A variable is associated with an output of the function (here, the output string is associated with the variable out). Client device 210 may execute the source of the portion of program code to determine the output, and may provide the output in-line with the reference that calls the portion of program code.

Figure 4B:
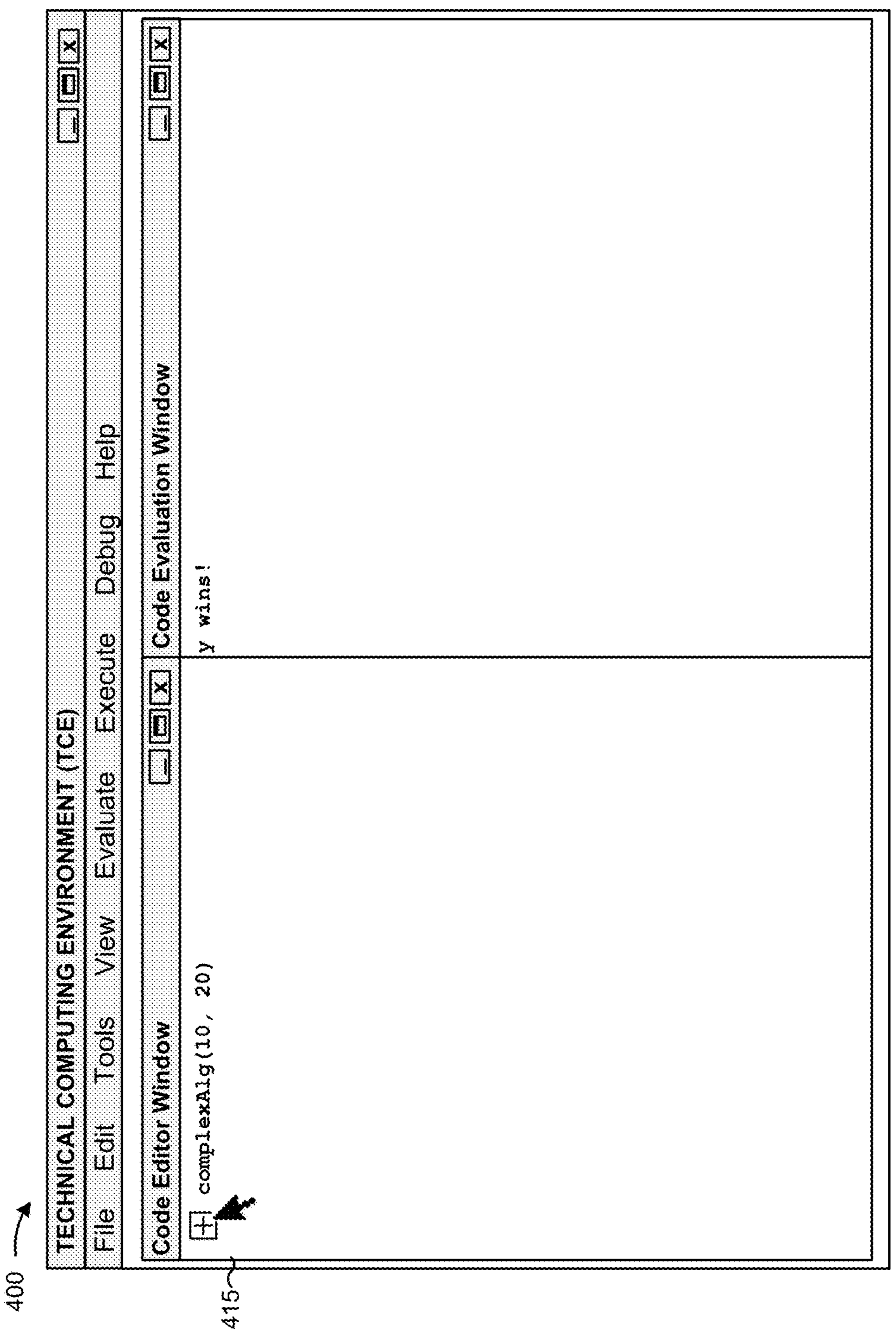

As shown in FIG. 4B, and by reference number 415, client device 210 may provide the program code for display via the code editor window of the user interface and in a format associated with in-line editing. As shown, assume that client device 210 receives a value of 10 for the input of in1 and a value of 20 for the input of in2. Assume further that client device 210 executes the complexAlg function based on the inputs of in1 and in2. As shown, client device 210 may provide an output of the complexAlg function for display via the code evaluation window of the user interface (e.g., "y wins!"). As shown, assume that client device 210 receives an interaction with an input mechanism to cause client device 210 to provide additional program code for display (e.g., a "+" button).

Figure 4C:
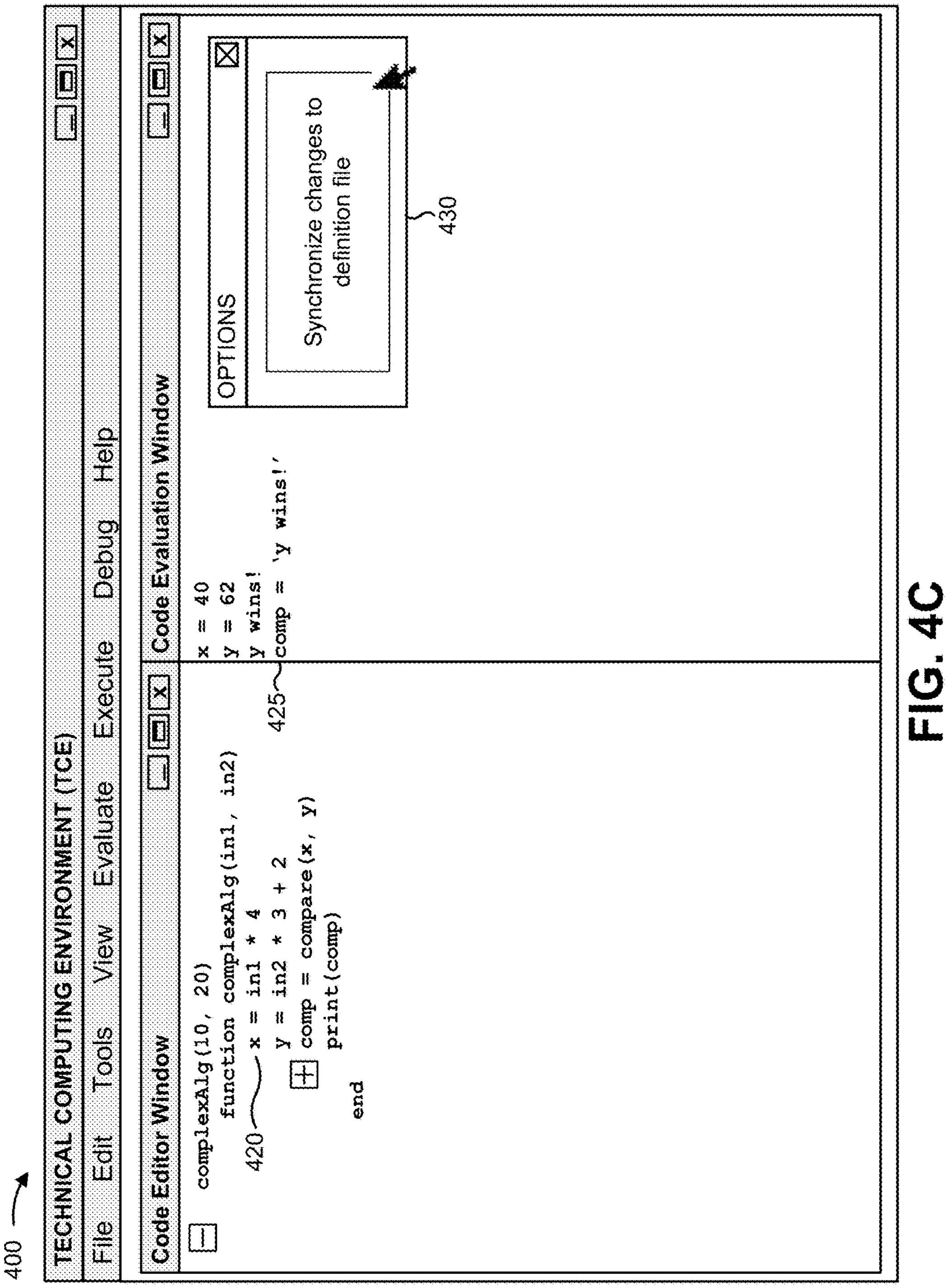

As shown in FIG. 4C, and by reference number 420, based on receiving the interaction with the input mechanism to cause client device 210 to provide additional program code for display, client device 210 may provide the additional program code for display. Here, client device 210 has provided for display a function definition (e.g., function complexAlg (in1, in2)), the first and second operations (e.g., x=in1*4 and y=in2*3+2), the reference (e.g., comp=compare(x, y)), and the command to print the variable comp.

As further shown in FIG. 4C, and by reference number 425, based on receiving the interaction shown in FIG. 4B, client device 210 may provide for display one or more intermediate outputs of the program code. Here, client device 210 has provided the first value (e.g., a value of x, based on performing the first operation of in1*4), the second value (e.g., a value of y, based on performing the second operation of in2*3+2), and an output of the portion of program code called by the reference (e.g., a string associated with the variable of comp, shown as 'y wins! '). As shown by reference number 430, client device 210 may receive an interaction with an input mechanism to cause client device 210 to modify the source of the portion of program code based on a modification to the portion of program code (e.g., a "Synchronize changes to definition file" button).

Figure 4D:
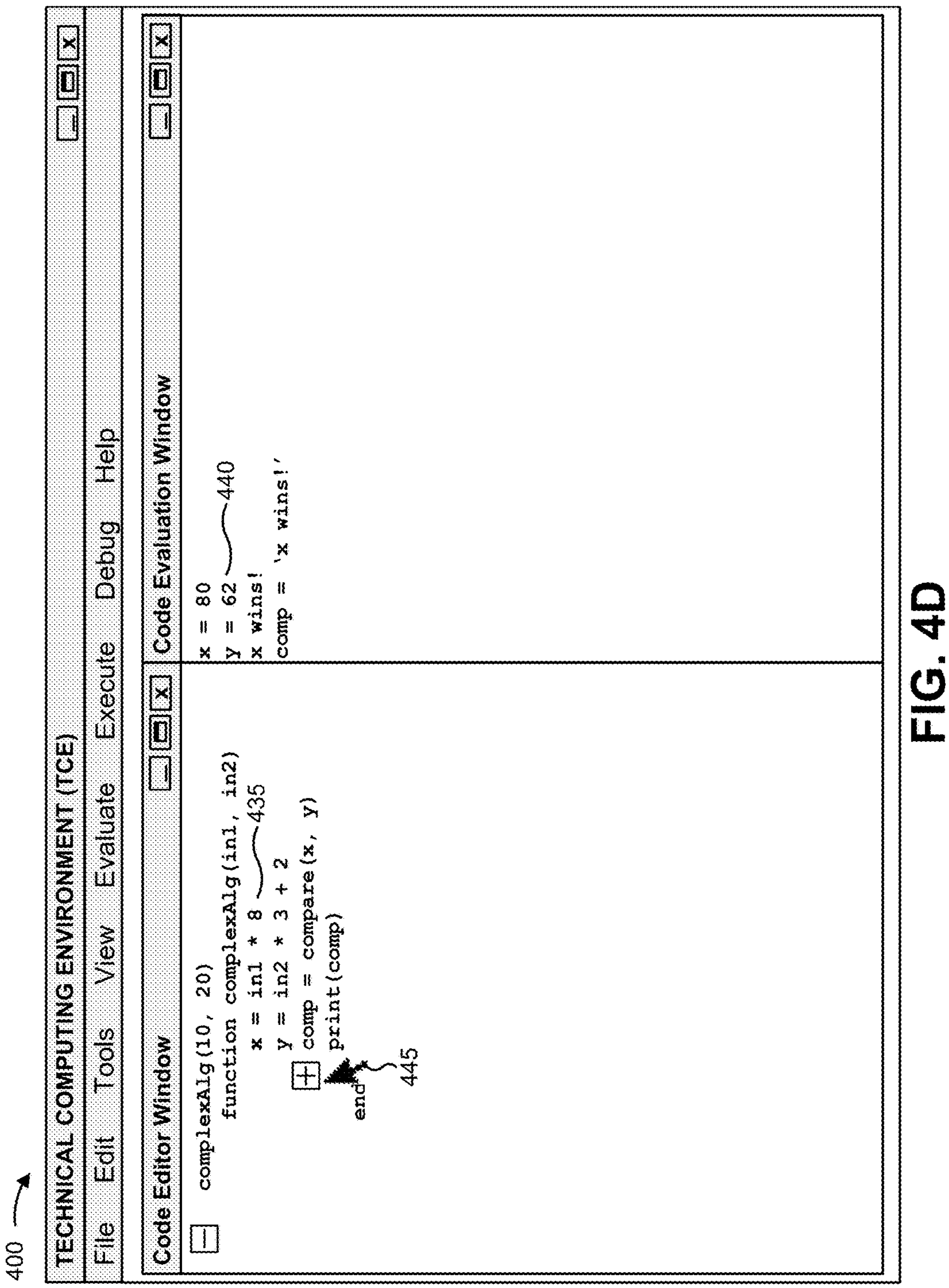

As shown in FIG. 4D, and by reference number 435, client device 210 may receive a modification to the program code (e.g., may receive a modification of the first operation from in1*4 to in1*8). As further shown, assume that client device 210 executes the first function, including the portion of program code, to determine a modified output. As shown by reference number 440, client device 210 may provide for display the modified output (e.g., a value of 80 associated with x, based on a modified first operation of in1*8; a value of 62 associated with y, based on the second operation of in2*3+2; a string of 'x wins!' associated with comp, based on a modified value of x being greater than a value of y; and a string of 'x wins!' provided by the complexAlg function, based on the string associated with comp). As shown by reference number 445, assume that client device 210 receives an interaction with an input mechanism to cause client device 210 to provide the portion of program code called by the reference, for display in-line with the program code (e.g., a "+" button associated with the comp=compare (x, y) reference).

Figure 4E:
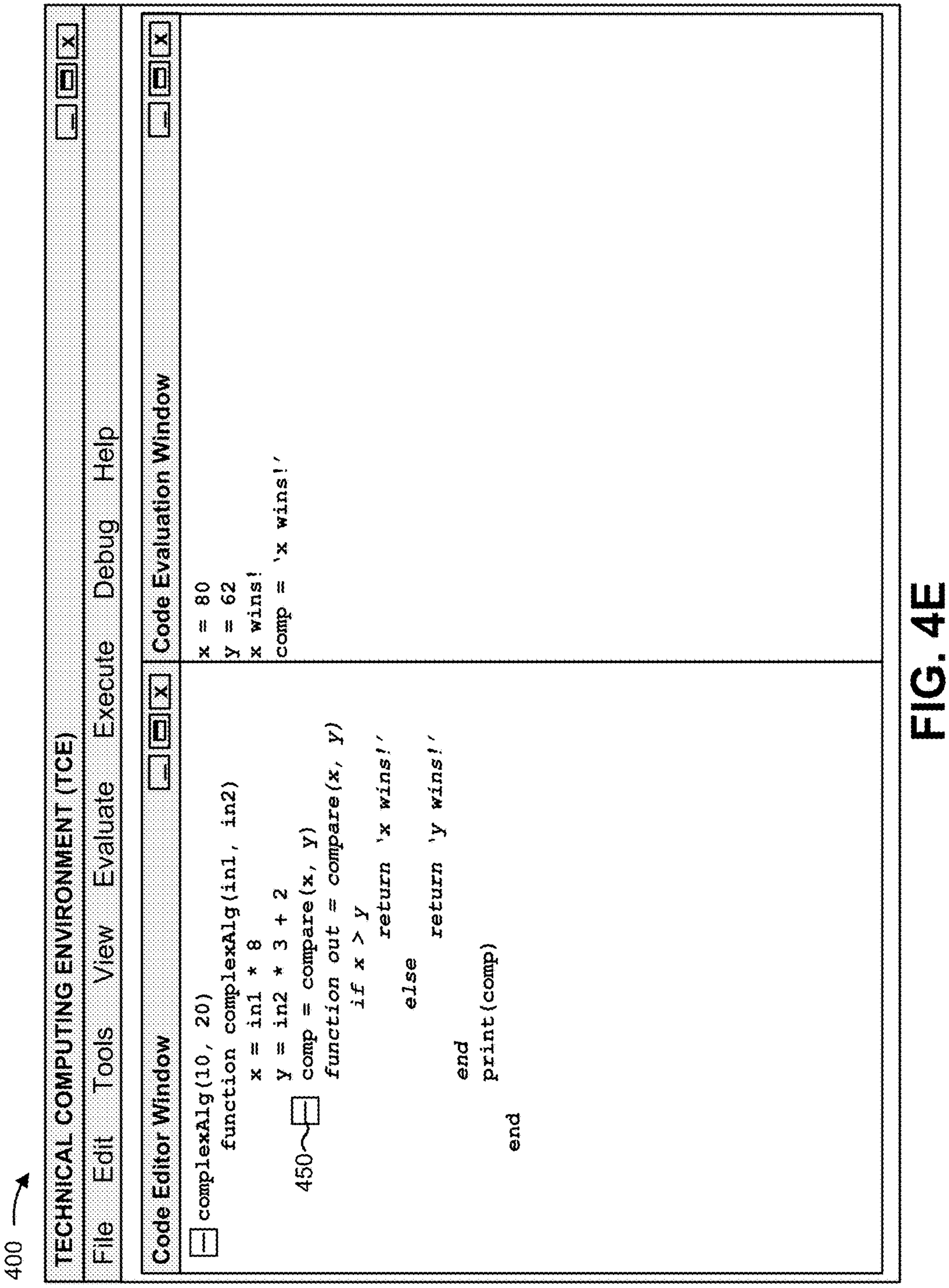

As shown in FIG. 4E, and by reference number 450, client device 210 may provide for display, via the code editor window of the user interface, the portion of program code.

As further shown, client device 210 may provide the portion of program code for display in-line with the program code.

Figure 4F:
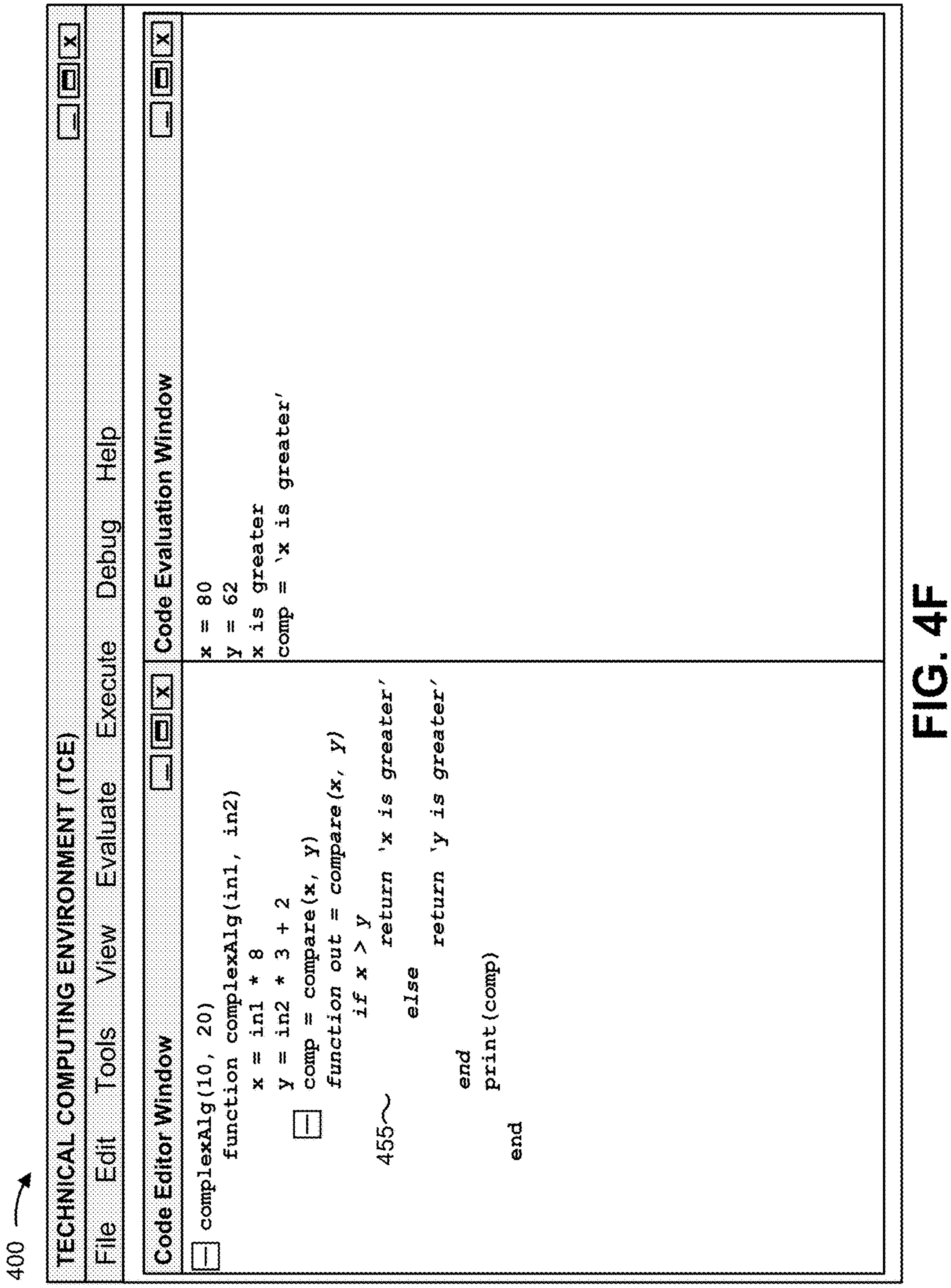

For the purpose of FIG. 4F, assume that client device 210 receives a modification to the portion of program code (e.g., by replacing 'x wins!' with 'x is greater', and by replacing 'y wins!' with 'y is greater'). Assume that client device 210 modifies the source of the portion of program code of compare(x, y) based on receiving a modification to the portion of program code. As shown in FIG. 4F, and by reference number 455, client device 210 may provide the modified portion of program code for display via the code editor window of the user interface. As further shown, client device 210 may execute the program code and the modified portion of program code. As shown, client device 210 may provide for display, via the code evaluation window of the user interface, one or more results associated with the program code and the modified portion of program code (e.g., 'x is greater', corresponding to the modified output of the first function; the modified output of the first operation, x=80; the output of the second operation, y=62; and a string associated with comp, based on the modified portion of program code).

Figure 4G:
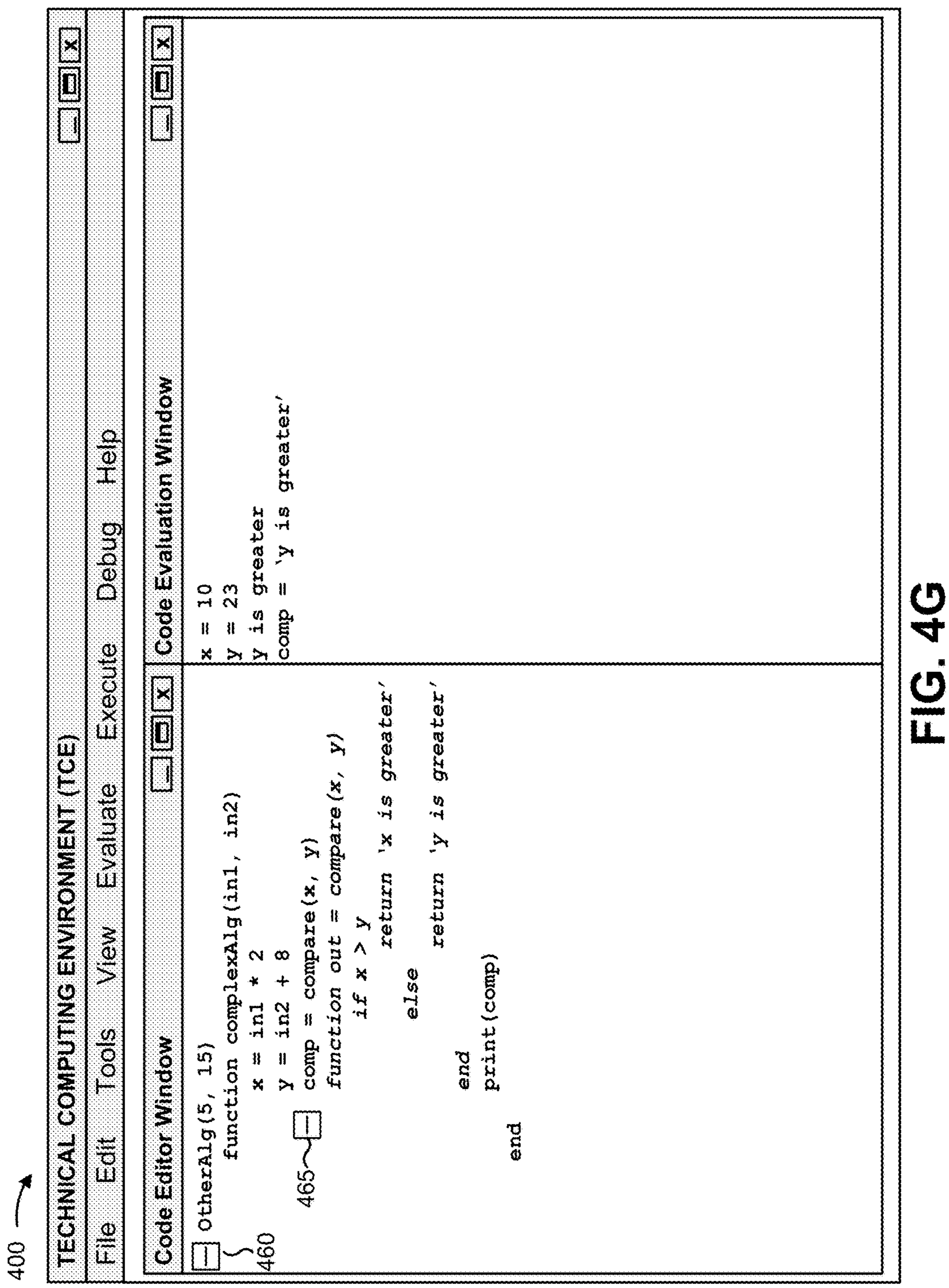

As shown in FIG. 4G, and by reference number 460, client device 210 may receive second program code including a third function (e.g., OtherAlg). As further shown, the third function may include a third operation and a fourth operation (e.g., the third operation may be x=in1*2, and the fourth operation may be y=in2+8). As shown by reference number 465, the third function may further include a reference that calls the modified portion of program code (e.g., the reference may be compare(x, y), and may call the modified portion of program code compare(x, y)). Based on the modified source of the portion of program code, client device 210 may provide the modified portion of program code (e.g., the portion of program code may include the strings 'x is greater' and 'y is greater', rather than 'x wins!' and 'y wins!'). Client device 210 may execute the second program code, including the modified portion of program code, and may provide one or more outputs to display via the code evaluation window of the user interface (e.g., 'y is greater', corresponding to the output of the third function; an output of the third operation, x=10; an output of the fourth operation, y=23; and a string associated with comp, based on the modified portion of program code).

While a code editor window and a code evaluator window of the user interface are shown as two separate windows for the purpose of FIGS. 4A-4G, in some implementations, the code editor window and the code evaluator window may be a single window of the user interface. For example, instead of providing results for display via the code evaluator window of the user interface, the results may be provided for display in-line with the program code, or in association with the program code (e.g., to the right of the program code, via the same window of the user interface as the program code).

As indicated above, FIGS. 4A-4G are provided merely as an example. Other examples are possible and may differ from what was described with regard to FIGS. 4A-4G.

Figure 5A:
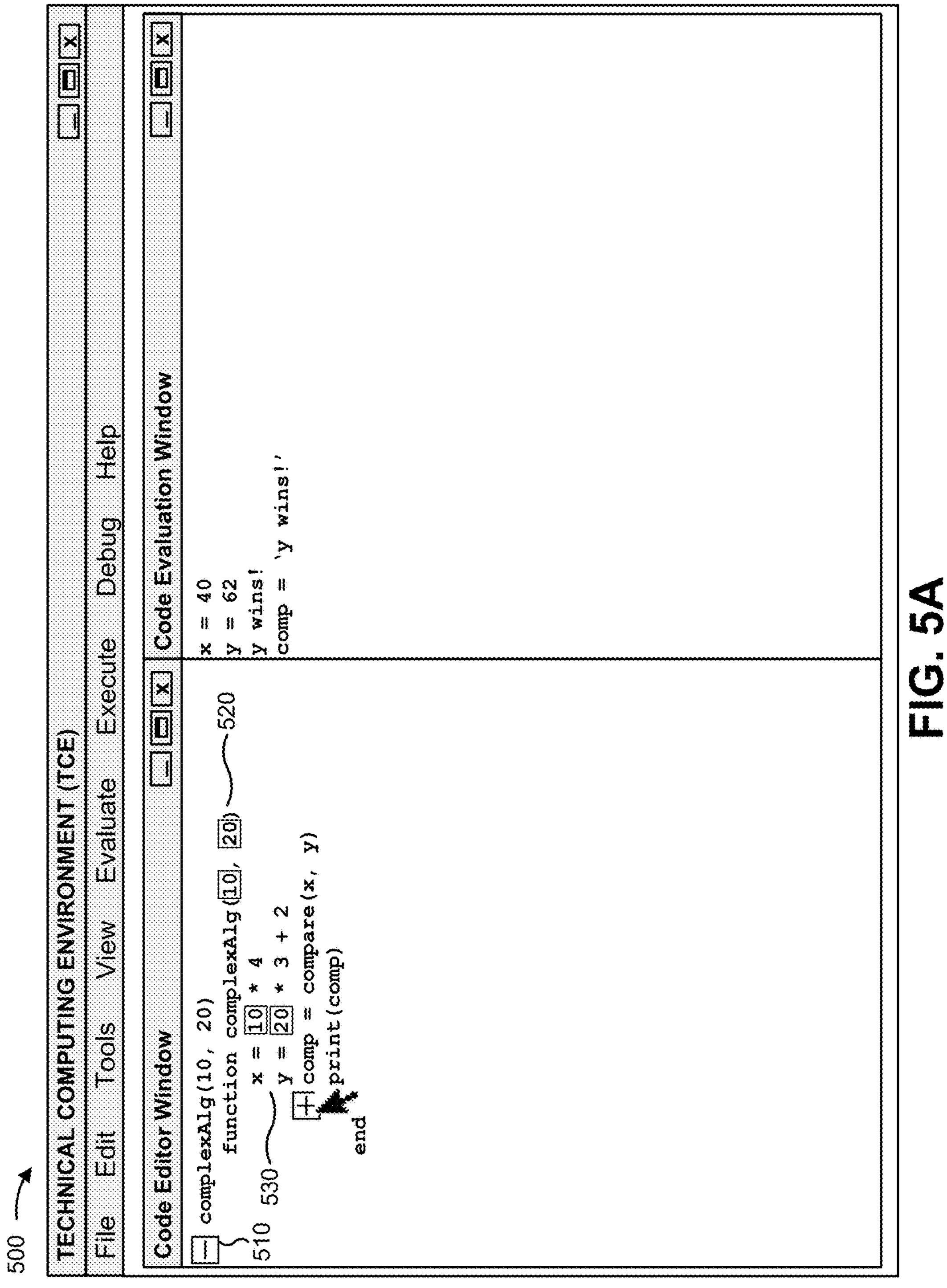
FIGS. 5A and 5B are diagrams of an example implementation of providing information related to a portion of program code.
Figure 5B:
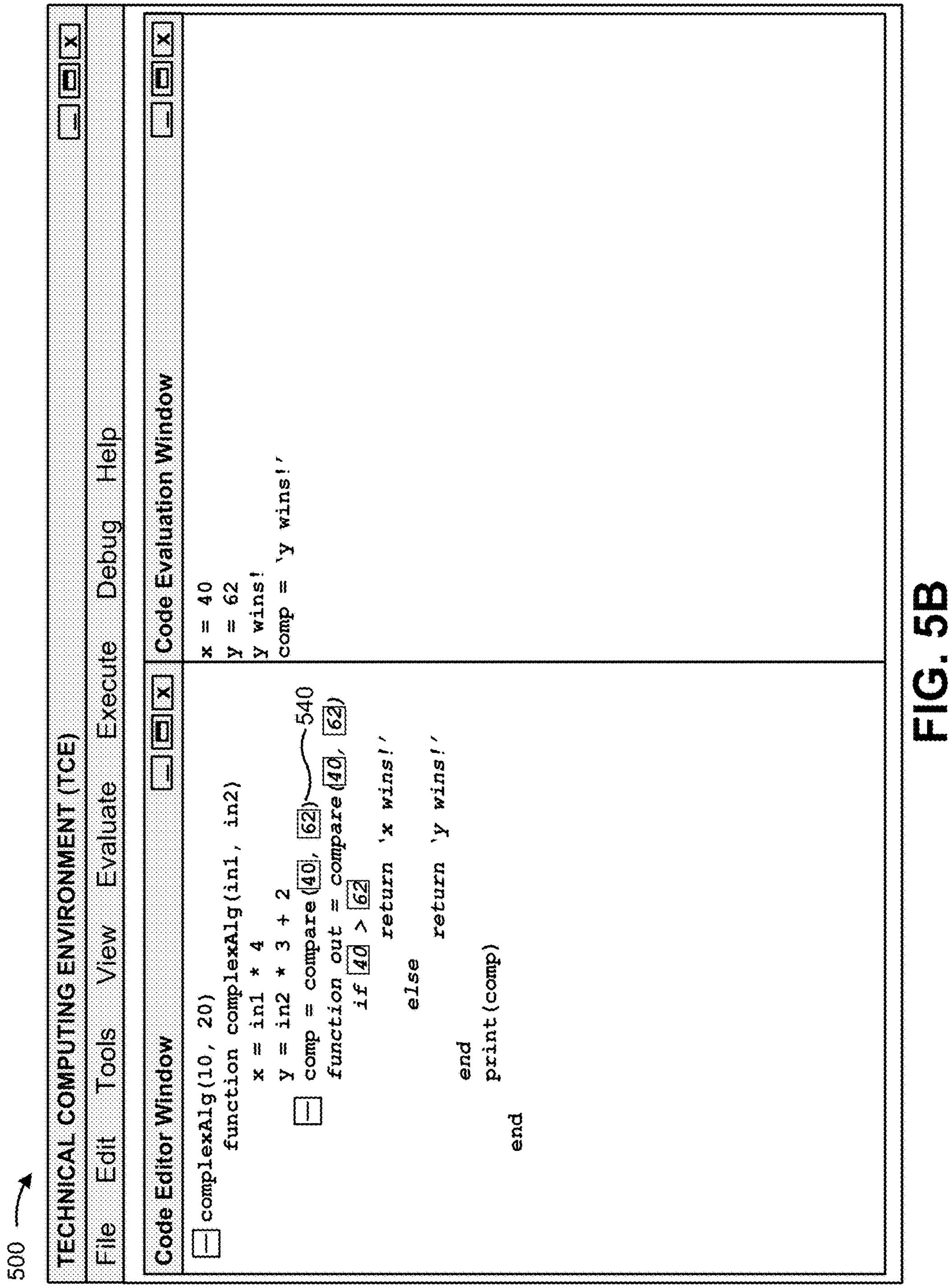

FIGS. 5A and 5B are diagrams of an example implementation 500 of providing information related to a portion of program code. For the purpose of FIGS. 5A and 5B, assume that the operations described in connection with FIG. 4 have not been performed. For the purpose of FIGS. 5A and 5B, portions of program code that are displayed in-line (e.g., based on a reference that calls the portion of program code) are illustrated in FIGS. 5A and 5B in italic typeface.

As shown in FIG. 5A, and by reference number 510, assume that client device 210 receives the following program code via a code editor window of a user interface of TCE 220:

```
complexAlg(10, 20)
  function complexAlg(in1, in2)
    x=in1*4
    y=in2*3+2
    comp=compare(x, y)
    print(comp)
  end
```

The above program code defines a function that accepts two inputs (here, the function is complexAlg, and the inputs are in1 and in2), and is described in more detail in connection with FIG. 4A elsewhere herein. The function includes a reference that calls the compare(x, y) portion of program code, which is described in more detail in connection with FIG. 4A elsewhere herein. Assume that the source of the compare(x,y) portion of program code is stored in a different file than the complexAlg function. Assume further that client device 210 executes the source of the compare(x,y) portion of program code to determine an output, and provides the output in-line with the reference.

As shown, client device 210 may provide for display, via the code editor window of the user interface, the program code associated with complexAlg. As shown by reference number 520, rather than providing for display the one or more variables associated with complexAlg (e.g., in1 and in2), client device 210 may provide for display the one or more values associated with the one or more variables (e.g., client device 210 may provide for display a number 10 in place of in1, and may provide for display a number 20 in place of in2).

As shown by reference number 530, client device 210 may provide for display an indicator in association with the one or more values (e.g., a box around the one or more values). In some implementations, the indicator may cause client device 210 to provide the variable values, which may aid a user in modifying the portion of program code. In some implementations, the indicator may indicate an association between multiple occurrences of the variable value (e.g., all instances of the value 10 may be associated with a first particular shape or color of box, while all instances of the value 20 may be associated with a second particular shape or color of box), which may aid a user in modifying and/or debugging the program code.

As shown, client device 210 may provide for display one or more intermediate outputs of the program code. Here, client device 210 has provided the first value (e.g., a value associated with x, based on performing the first operation in1*4), the second value (e.g., a value associated with y, based on performing the second operation in2*3+2), and an output of the portion of program code (e.g., a string associated with the variable of comp, shown as 'y wins!'). As shown, assume that client device 210 receives an interaction with an input mechanism to cause client device 210 to provide the portion of program code called by the reference, for display in-line with the program code (e.g., a button including a +, associated with the comp=compare(x, y) reference).

As shown in FIG. 5B, based on receiving the interaction to cause client device 210 to provide the portion of program code for display, client device 210 may provide the portion of program code for display. As shown by reference number 540, rather than providing for display the one or more variables associated with the portion of program code, client device 210 may provide for display the one or more values associated with the variables. Here, client device 210 has provided for display a function definition (e.g., function complexAlg (in1, in2)), the two calculations using the two inputs (e.g., x=10*4 and y=20*3+2), the reference that calls the portion of program code (e.g., comp=compare(40, 62)), and the command to print the value of the output of the portion of program code (e.g., print(comp)).

As further shown in FIG. 5B, based on receiving the interaction shown in FIG. 5A, client device 210 may provide for display one or more intermediate outputs of the program code. Here, client device 210 has provided the first value (e.g., a value associated with x, based on performing the operation 10*4), the second value (e.g., a value associated with y, based on performing the operation 20*3+2), and an output of the portion of program code (e.g., a string associated with the variable of comp, shown as 'y wins! ').

As indicated above, FIGS. 5A and 5B are provided merely as an example. Other examples are possible and may differ from what was described with regard to FIGS. 5A and 5B.

FIGS. 6A-6G are diagrams of an example implementation 600 of testing program code using in-line function synchronization. For the purpose of FIGS. 6A-6G, portions of program code that are displayed in-line (e.g., based on a reference that calls the portion of program code) are illustrated in FIGS. 6A-6G in italic typeface.

Figure 6A:
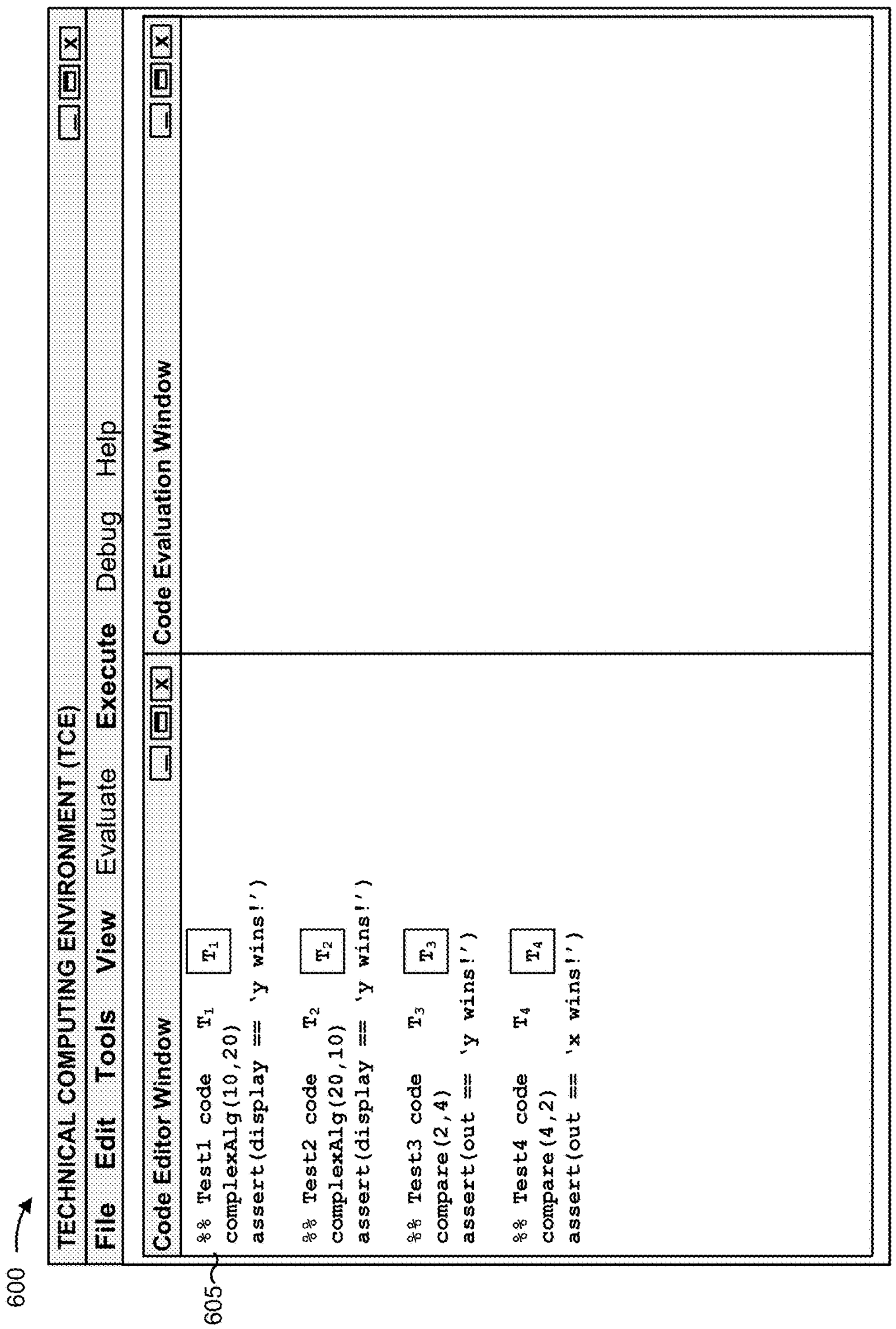

As shown in FIG. 6A, and by reference number 605, assume that client device 210 receives program code via a code editor window of a user interface of TCE 220 that includes four portions of program code (here, T1, T2, T3, and T4) as follows:

```
%% Test1 code [T1]
complexAlg(10,20)
assert(display=='y wins!')
%% Test2 code [T2]
complexAlg(20,10)
assert(display=='y wins!')
%% Test3 code [T3]
compare(2,4)
assert(out=='y wins!')
%% Test4 code [T4]
compare(4,2)
assert(out=='x wins!')
```

Assume further that the portions of program code, when executed, will test a function included in the program code, and will generate one of two outputs: a 'test successful' string; or a 'test failed' string and one or more values associated with one or more variables. Assume that the T2 portion of program code is incorrectly constructed, and that the T2 portion of program code, if correctly constructed, would include:

```
complexAlg(20,10)
assert(display=='x wins!')
```

Figure 6B:
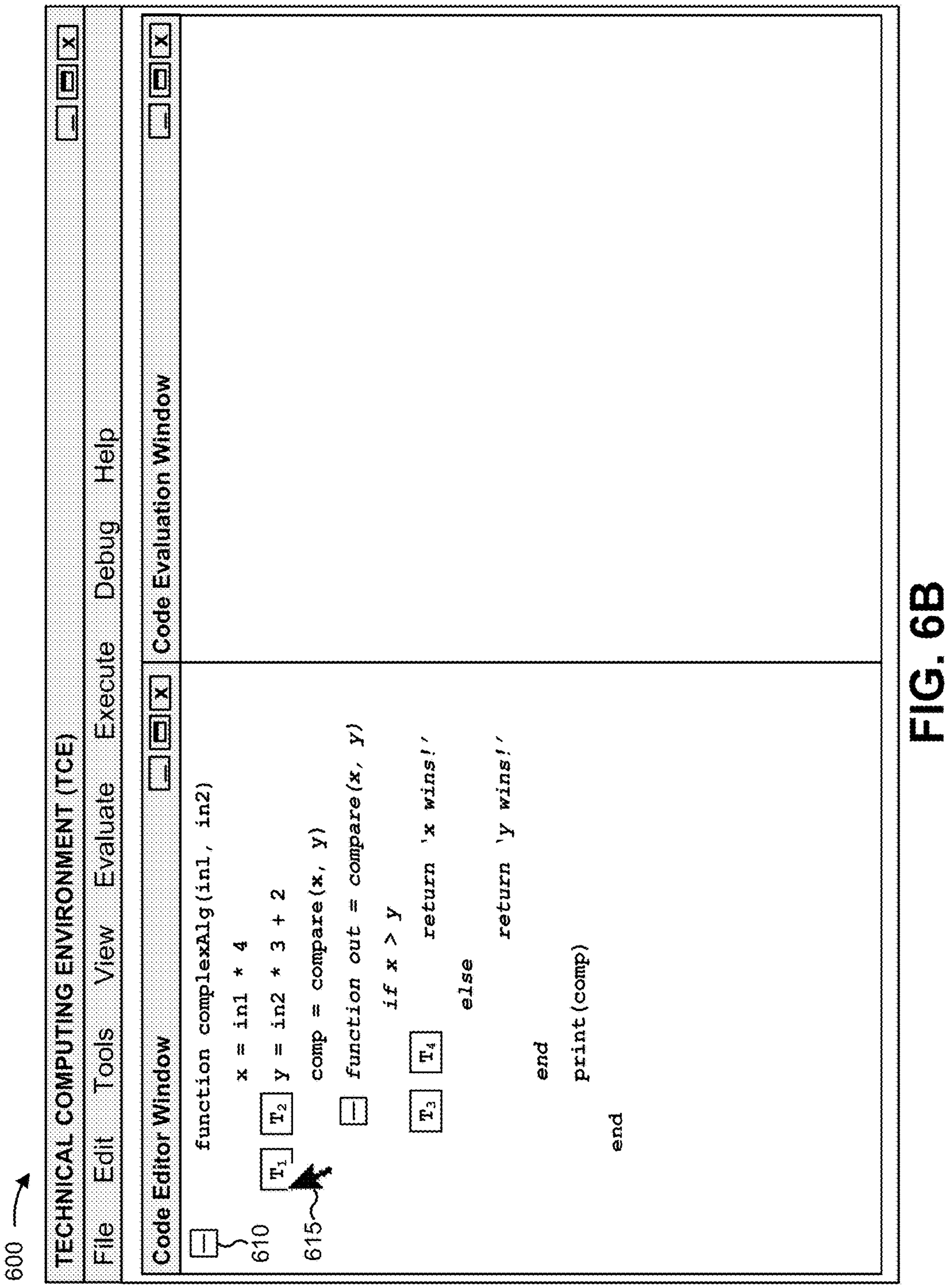

As shown in FIG. 6B, and by reference number 610, assume that client device 210 has received program code including the complexAlg function and the compare function, which are explained in more detail elsewhere herein. Assume that client device 210 has received references of T1, T2, T3, and T4, that call the portions of program code, in association with the complexAlg function and the compare function (e.g., the user has included T1 and T2 in association with the complexAlg function, and T3 and T4 in association with the compare function). As shown by reference number 615, assume that client device 210 receives an interaction with an input mechanism to cause client device 210 to provide the portion of program code called by the reference of T1, for display with the program code (e.g., a "T1" button, associated with the T1 reference).

As shown in FIG. 6C, and by reference number 620, based on receiving the interaction, client device 210 may provide for display, in the code editor window of the user interface, the portion of program code associated with T1. As further shown, assume that client device 210 executes the program code and the portion of program code associated with T1 to determine one or more outputs (e.g., x=40, y=62, y wins!, comp='y wins!', and 'Test 1 successful'). As shown by reference number 625, assume that client device 210 provides for display, via the code evaluation window of the user interface, the one or more outputs of the program code and the portion of program code associated with T1. As shown, assume that client device 210 provides for display an indicator of an association between the portion of program code and the output of the portion of program code (e.g., the portion of program code and the output of the portion of program code may be highlighted). As shown by reference number 630, assume that client device 210 receives an interaction with an input mechanism to cause client device 210 to provide the portion of program code called by the reference of T2, for display with the program code (e.g., a "T2" button associated with the reference of T2).

As shown in FIG. 6D, and by reference number 635, based on receiving the interaction, client device 210 may provide for display, in the code editor window of the user interface, the portion of program code associated with T2. As further shown, assume that client device 210 executes the portion of program code associated with T2 to determine an output of the program code and the portion of program code associated with T2 (e.g., x=80, y=32, comp='x wins!', and 'Test 2 failed'). As shown by reference number 640, assume that client device 210 provides for display, via the code evaluation window of the user interface, the output of the portion of program code associated with T2. As shown, assume that client device 210 provides for display an indicator of an association between the portion of program code associated with T2 and the output of the portion of program code (e.g., the portion of program code associated with T2 and the output of the portion of program code may be highlighted or shaded). In some implementations, different indicators of associations may be color-coded to aid a user in distinguishing the different indicators of associations.

As shown in FIG. 6E, and by reference number 645, assume that a user provides a modification, via the code editor portion of the user interface, to the portion of program code associated with T2 (e.g., by changing "assert (display=='y wins!'" to "assert(display=='x wins!'"). As shown by reference number 650, based on the modification, client device 210 may execute the portion of program code to determine a modified output (e.g., "Test 2 successful" rather than "Test 2 failed"). Assume that client device 210 synchronizes and/or stores, locally, the modification to a source of the portion of program code associated with T2. In this way, client device 210 may facilitate testing of a function using a unit test reference, and editing of a unit test reference in-line to correct an incorrect unit test reference.

Figure 6F:
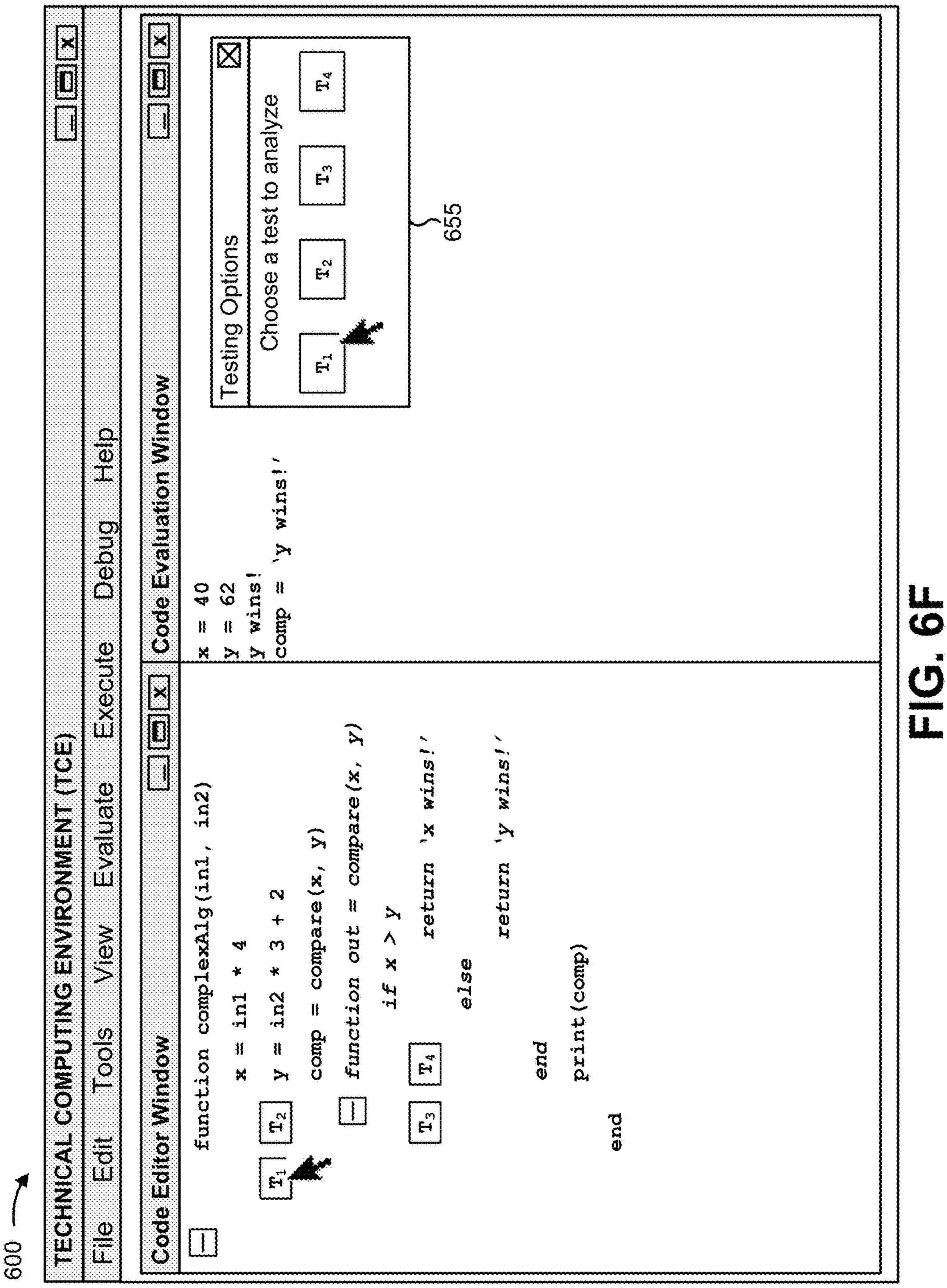

As shown in FIG. 6F, and by reference number 655, client device 210 may provide an element of the code evaluation window of the user interface (e.g., a button in a Testing Options window) to facilitate an interaction to cause client device 210 to analyze a portion of program code (e.g., T1, T2, T3, or T4). As shown, client device 210 may receive an interaction with the element of the code evaluation window of the user interface to cause client device 210 to analyze the portion of program code associated with T1.

Figure 6G:
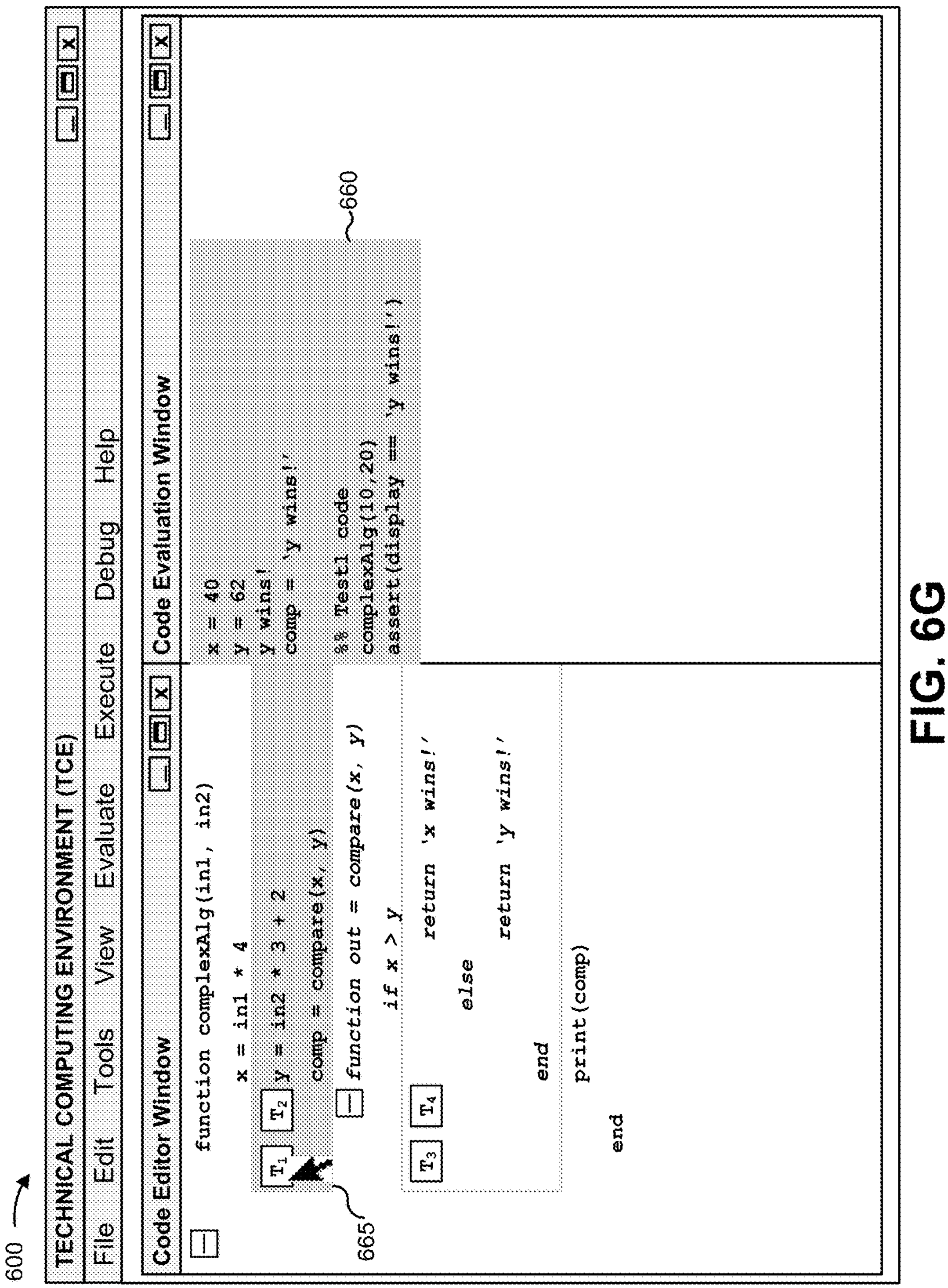

As shown in FIG. 6G, and by reference number 660, based on receiving the interaction, client device 210 may provide for display, via the code evaluation window of the user interface, the portion of program code associated with T1. As further shown by reference number 665, client device 210 may provide for display information indicating one or more sections of the program code associated with one or more references that call T1 (e.g., client device 210 may highlight the portion of program code provided via the code evaluation window of the user interface, and may highlight the one or more sections of the program code).

As indicated above, FIGS. 6A-6G are provided merely as an example. Other examples are possible and may differ from what was described with regard to FIGS. 6A-6G.

Figure 7:
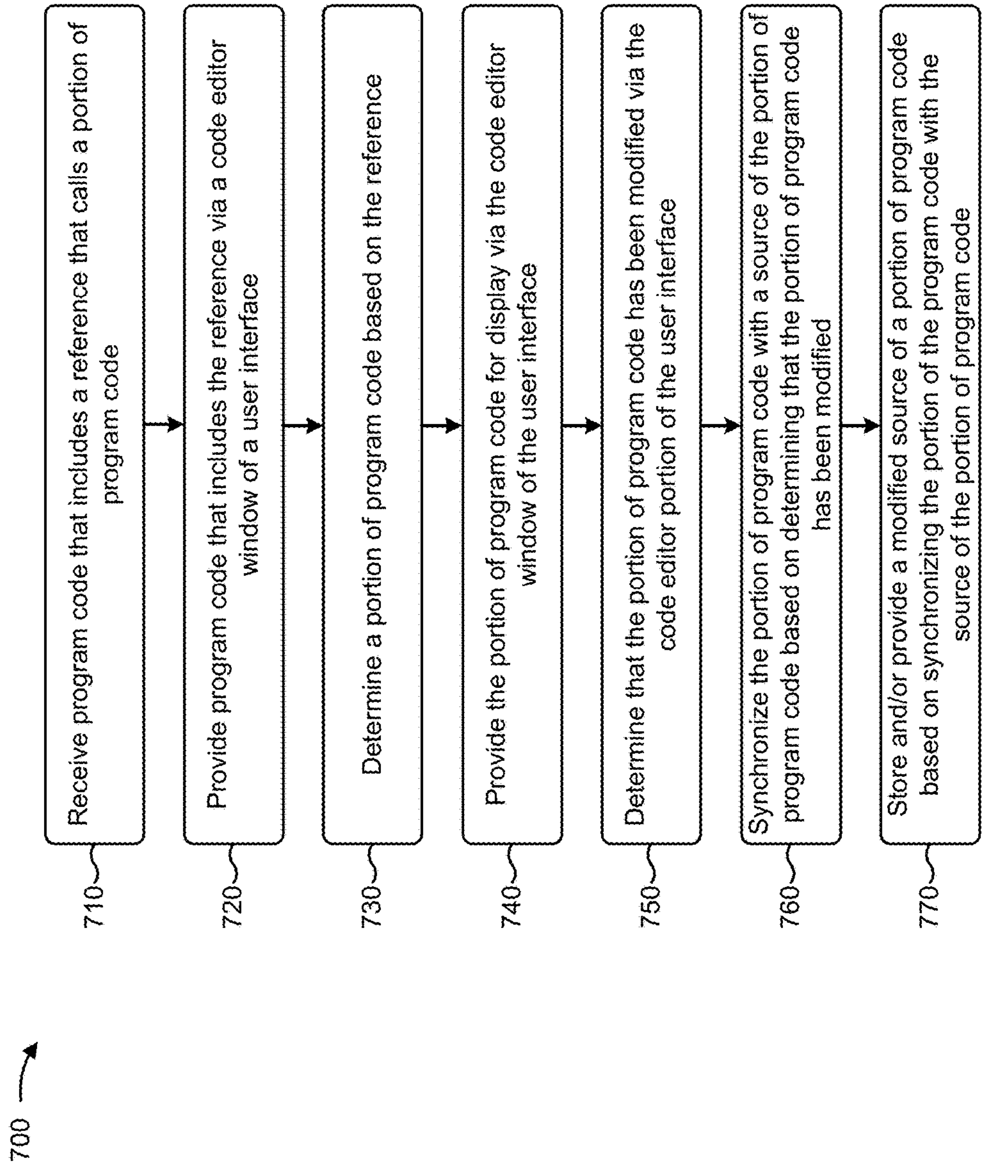
FIG. 7 is a flow chart of an example process for receiving and storing a modification to a portion of program code.

FIG. 7 is a flow chart of an example process 700 for receiving and storing a modification to a portion of program code. In some implementations, one or more process blocks of FIG. 7 may be performed by client device 210. In some implementations, one or more process blocks of FIG. 7 may be performed by another device or a group of devices separate from or including client device 210, such as server device 230.

As shown in FIG. 7, process 700 may include receiving program code that includes a reference that calls a portion of program code (block 710). For example, client device 210 (e.g., via TCE 220) may receive program code as shown in FIG. 4A, and by reference numbers 405 and 410. The program code may include a reference that calls a portion of program code. In some implementations, a source of the portion of program code may be included in the program code. Additionally, or alternatively, the source may be separate from the program code. For example, the source may be associated with a different file than the program code, may be stored in a different location than the program code, or the like.

Program code (sometimes referred to herein as code) may be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, the program code may include multiple references that call a particular portion of program code. For example, assume that a particular portion of program code defines a function that determines a square root of an input number. Assume further that program code requires a determination of a square root of three different numbers. The program code may include three references that receive the three different numbers as inputs. The three references may call the particular portion of program code.

In some implementations, the portion of program code may define a function (e.g., the portion of program code may receive an input, may perform an operation to determine an output, and may return the output). In some implementations, the portion of program code may define a script (e.g., the portion of program code may determine an output by performing an operation without receiving an input). In some implementations, the portion of program code may define a class (e.g., a category of one or more values that share a common characteristic).

In some implementations, the portion of program code may define a unit test (e.g., a function, a class, or the like, used to perform a test related to program code), as shown in FIG. 6A, and by reference number 605. For example, assume a user wants to verify that a function is properly performing an operation. The user may create a portion of program code that performs the operation with a set input to produce a test output, and may compare the test output to a known output (e.g., a correct output of the operation given the set input). If the test output matches the known output, client device 210 may determine that the function is properly performing the operation. If the test output does not match the known output, client device 210 may determine that the function is improperly performing the operation. In this way, client device 210 may ensure that the function is properly performing the operation for a given input.

In some implementations, the portion of program code may include a reference other than the reference that calls the portion of program code. For example, a first portion of program code may include a reference that calls a second portion of program code. In this way, a user may use references to perform multiple, different operations using portions of program code.

In some implementations, the reference may be included based on a user interaction. For example, assume that a source of program code does not include a reference. In that case, a user may cause client device 210 to include a reference (e.g., a unit test reference, or the like) in order to cause client device 210 to execute a portion of program code called by the reference. In this way, a user may cause client device 210 to execute, in association with executing a source of program code, a portion of program code called by a reference.

As further shown in FIG. 7, process 700 may include providing program code that includes the reference via a code editor window of a user interface (block 720). For example, client device 210 may provide the program code that includes the reference via a code editor window of a user interface (e.g., a user interface associated with TCE 220), as shown in FIG. 4C, and by reference number 425. In some implementations, the program code may contain multiple, different references associated with multiple, different portions of program code. In some implementations, client device 210 may provide a sub-part of program code for display (e.g., a first line of the program code, a first function associated with the program code, or the like). Based on a user interaction associated with the sub-part of the program code (e.g., the user may interact with a button displayed near the sub-part of the program code, may interact with the sub-part of the program code, or the like), client device 210 may provide for display additional program code (e.g., an additional sub-part of the program code, a remainder of the program code, or the like).

In some implementations, client device 210 may provide for display, in association with the reference, a reference indicator that indicates the reference (e.g., a "+" button next to a reference, an arrow button, a "Test" button next to a unit test reference, a shaded area associated with the reference, or the like). Based on a user interaction with the reference indicator, client device 210 may provide for display the portion of program code called by the reference, as described in more detail elsewhere herein.

In some implementations, client device 210 may provide program code including a unit test reference. For example, assume that a user inputs program code including a reference that references a unit test portion of program code. In that case, client device 210 may provide the program code including the reference that references the unit test portion of program code. In some implementations, client device 210 may provide the unit test portion of program code via another window of the user interface, such as a code evaluation window of the user interface.

As further shown in FIG. 7, process 700 may include determining a portion of program code based on the reference (block 730). For example, client device 210 may determine a portion of program code called by the reference. In some implementations, client device 210 may generate the portion of program code based on a source of the portion of program code.

In some implementations, client device 210 may determine the portion of program code based on information stored in memory (e.g., information related to a modification to a portion of program code). For example, assume that client device 210 has previously received a modification to a particular portion of program code. Client device 210 may store a modified version of the particular portion of program code based on the modification to the particular portion of program code. Assume that client device 210 receives program code including a reference that calls the particular portion of program code. Client device 210 may determine the portion of program code based on the modified version of the portion of program code (e.g., the portion of program code may include the modification).

As further shown in FIG. 7, process 700 may include providing the portion of program code for display via the code editor window of the user interface (block 740), as shown in FIG. 4E and by reference number 455. For example, client device 210 may provide the portion of program code for display via the code editor window of the user interface (e.g., the user interface associated with TCE 220). In some implementations, client device 210 may provide the portion of program code for display based on receiving a user interaction.

In some implementations, client device 210 may provide the portion of program code for display in-line with the program code. In some implementations, "in-line" may indicate that the portion of program code is provided for display in association with the program code. For example, in-line may indicate that the program code and portion of program code reside at a common location, such as in a file. In-line may further indicate that the program code and the portion of program code are presented in a manner that indicates a hierarchical relationship between the program code and the portion of the program code. For example, the program code may be displayed to a left margin, and the portion of program code may be displayed indented from the left margin and in place of a reference within the program code that calls the portion of program code. In some implementations, the portion of program code may be provided in association with the reference. For example, client device 210 may provide the reference for display, and may provide the portion of program code for display below the reference.

In some implementations, client device 210 may execute the portion of program code in association with providing the portion of program code for display. For example, client device 210 may execute the portion of program code to determine a result of executing the portion of program code, such as an output, or the like. In some implementations, client device 210 may provide, for display, information identifying the result in association with the portion of program code (e.g., an output may be provided for display in-line with the portion of program code, or the like).

In some implementations, client device 210 may provide for display the portion of program code and an input associated with the portion of program code, as shown in FIG. 5B, and by reference number 540. For example, assume that an input is associated with the portion of program code (e.g., the portion of program code receives a value of the input and performs an operation using the value to determine an output). Client device 210 may provide the input associated with the portion of program code via the code editor window of the user interface (e.g., client device 210 may provide for display the value in place of the input). In this way, client device 210 may provide, in association with a portion of program code, a value of an input associated with the portion of program code, which may aid in understanding, modifying, and/or debugging the portion of program code.

In some implementations, client device 210 may provide an intermediate output associated with the portion of program code. For example, assume that the portion of program code performs an operation using a first input to determine an intermediate output, and then performs the operation using the intermediate value to determine a final output. Client device 210 may provide the intermediate output in association with the portion of program code (e.g., the intermediate output may be provided for display in a portion of the code related to the intermediate output, may be provided for display in place of a variable associated with the intermediate output, or the like), via the code editor window of the user interface. In this way, client device 210 may provide an intermediate value associated with program code and/or portion of program code, which may aid in understanding, modifying, and/or debugging the program code and/or portion of program code.

In some implementations, client device 210 may provide the portion of program code based on receiving a user interaction. For example, assume that program code includes a reference that calls a portion of program code. Assume further that the code editor window of the user interface facilitates a user interaction (e.g., by providing a button) to cause client device 210 to provide the portion of program code called by the reference. Assume that client device 210 receives a user interaction that causes client device 210 to provide the portion of program code. Client device 210 may provide the portion of program code based on the user interaction. In this way, client device 210 may provide for display a specific portion of program code based on receiving a request to view the specific portion of program code.

In some implementations, client device 210 may provide a greater or lesser portion of information related to the portion of program code. For example, assume that client device 210 receives a first user interaction to cause client device 210 to provide a lesser portion of information related to the portion of program code. Based on the first user interaction, client device 210 may provide, for display, the portion of program code, but may not provide a value received as input and/or provided as output by the portion of program code. As another example, assume that client device 210 receives a second user interaction to cause client device 210 to provide a greater portion of information related to the portion of program code. Based on the second user interaction, client device 210 may provide, for display, the portion of program code including the value received as input and/or provided as output.

In some implementations, client device 210 may provide a portion of program code related to a unit test reference, as shown by FIGS. 6A-6G. For example, assume that a user has provided program code that includes a unit test reference. Assume further that client device 210 provides for display the program code and the unit test reference via the code editor window of the user interface. The user may cause client device 210 to provide a portion of program code related to the unit test reference. In some implementations, the user may interact with a reference indicator (e.g., a button associated with the unit test reference) to cause client device 210 to provide the portion of program code called by the unit test reference. In some implementations, the user may interact with a reference indicator via the code evaluation window of the user interface. In that case, client device 210 may provide for display the portion of program code called by the unit test reference, and may further provide for display information indicating an association between the portion of program code, the reference indicator, and/or a sub-part of the program code (e.g., a sub-part of the program code in which the unit test reference is included).

In some implementations, a unit test reference may be associated with a particular line of program code. The unit test reference may be associated with the particular line of program code based on a user interaction. For example, a user may cause client device 210 to place the unit test reference at a particular line of program code, a particular conditional branch in the program code, or the like, in order to test the particular line, conditional branch, etc. In some implementations, upon executing the unit test reference, client device 210 may provide an indication that the unit test reference did not execute the particular line of program code (e.g., that the unit test reference did not perform an operation defined by the particular line of program code, or the like). Based on the indication, the user may investigate why the unit test reference did not execute the particular line of program code, and may modify the unit test reference and/or the particular line of program code accordingly. In this way, client device 210 may facilitate testing of a particular part of program code using a unit test reference.

As further shown in FIG. 7, process 700 may include determining that the portion of program code has been modified via the code editor window of the user interface (block 750). For example, client device 210 may determine that the portion of program code has been modified via the code editor window of the user interface. In some implementations, the portion of program code may be modified based on a user interaction.

In some implementations, the user may modify an input of the portion of program code (e.g., the user may modify a value of an input used by the portion of program code, may modify an argument of a mathematical function, may add an input to a function in the portion of program code, or the like). In some implementations, the user may modify an operation of the portion of program code (e.g., the user may modify a mathematical operation, may replace an operation with a different operation, may include another reference that calls a different portion of program code, or the like). In some implementations, the user may modify an output of the portion of program code (e.g., the user may remove an output of the portion of program code, may add an output of the portion of program code, or the like).

As further shown in FIG. 7, process 700 may include synchronizing the portion of program code with a source of the portion of program code based on determining that the portion of program code has been modified (block 760). For example, client device 210 may synchronize the portion of program code with a source of the portion of program code based on determining that the portion of program code has been modified. In some implementations, synchronizing may entail that an executable relationship is maintained between the portion of program code and the source. For example, the modification to the portion of the program code may be stored locally and executed, but the source of the portion of program code may not be modified.

In some implementations, client device 210 may create a modified source by synchronizing the portion of program code with the source. In some implementations, client device 210 may provide the modified source to another device (e.g., server device 230, or another device). In some implementations, client device 210 may create the modified source based on a user interaction (e.g., a user may interact with a button or the like, to cause client device 210 to generate the modified source), as shown in FIG. 4C, and by reference number 435.

In some implementations, client device 210 may determine that a value of a variable of a portion of program code has been modified. For example, client device 210 may receive a modification to an input of the portion of program code, an intermediate output of the portion of program code, or the like. Based on receiving the modification, client device 210 may synchronize the value associated with the variable with the source of the portion of program code. In this way, client device 210 may ensure that a modified variable value of a portion of program code is synchronized in the source of the portion of program code.

As further shown in FIG. 7, process 700 may include storing and/or providing a modified source of a portion of program code based on synchronizing the portion of program code with the source of the portion of program code (block 770). For example, client device 210 may store and/or provide a modified source of a portion of program code based on synchronizing the portion of program code with the source of the portion of program code. In some implementations, client device 210 may locally store the modified source. Additionally, or alternatively, client device 210 may provide the modified source to a different device, such as server device 230, for storage.

In some implementations, client device 210 may overwrite an original source of a portion of program code based on a modified source. For example, assume that an original source of a portion of program code is stored locally on client device 210. Assume further that client device 210 receives a modification to a portion of program code that is defined by the original source. Client device 210 may generate a modified source of the portion of program code based on the modification to the portion of program code. Client device 210 may delete the original source, and may store the modified source. In some implementations, client device 210 may provide for display a modified portion of program code that is defined by the modified source. In this way, client device 210 may generate and store a modified source of a portion of program code based on a modification to a portion of program code defined by the modified source of the portion of program code.

In some implementations, client device 210 may store a copy of a modified source of a portion of program code. For example, assume that program code contains one or more references that call a portion of program code. Assume that client device 210 receives a modification to the portion of program code called by the one or more references. Based on receiving the modification to the portion of program code, client device 210 may generate a modified source of the portion of program code. Client device 210 may store and/or provide for display the modified source of the portion of program code. In this way, client device 210 may locally store a modified source of a portion of program code, rather than synchronizing, to the source of the portion of program code, the modification.

In some implementations, client device 210 may selectively overwrite the original source, or store a copy of the modified source, based on user interaction. For example, assume that the code editor window of the user interface facilitates a user interaction to overwrite an original source after generating a modified source. Assume the user causes client device 210 to overwrite the original source. Client device 210 may delete the original source, and may store the modified source. In this way, client device 210 may take an action related to a modified source based on a user interaction.

In some implementations, client device 210 may selectively overwrite the original source, or store a copy of the modified source, based on an origin of the original source. For example, assume that a particular user created the original source. Assume further that client device 210 provides a portion of program code based on the original source, and that the particular user modifies the portion of program code. Based on the particular user that created the original source being the same particular user that modified the portion of program code, client device 210 may overwrite the original source. As another example, assume that a first user creates the original source. Assume further that a second user modifies a portion of program code referenced by the original source to create a modified source. Based on the first user being different than the second user, client device 210 may not overwrite the original source. Additionally, or alternatively, client device 210 may prompt the second user to indicate whether to overwrite the original source or store a copy of the modified source. In this way, client device 210 may selectively overwrite the original source, or store a copy of the modified source, based on a heuristic determination.

In some implementations, client device 210 may associate a version identifier with an original portion of program code. Client device 210 may further associate another, different version identifier with a modified portion of program code. As client device 210 continues to generate modified portions of program code, client device 210 may continue to associate different version identifiers with the modified portions of program code. In some implementations, client device 210 may provide a portion of program code based on a version identifier. For example, assume client device stores an original portion of program code associated with a first version identifier, and a modified portion of program code associated with a second version identifier. Assume further that a user requests that client device 210 provide the original portion of program code based on the first version identifier. Client device 210 may provide the original portion of program code, based on the request and the first version identifier. In this way, client device 210 may store, identify, and provide multiple, different versions of a portion of program code in association with version identifiers.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
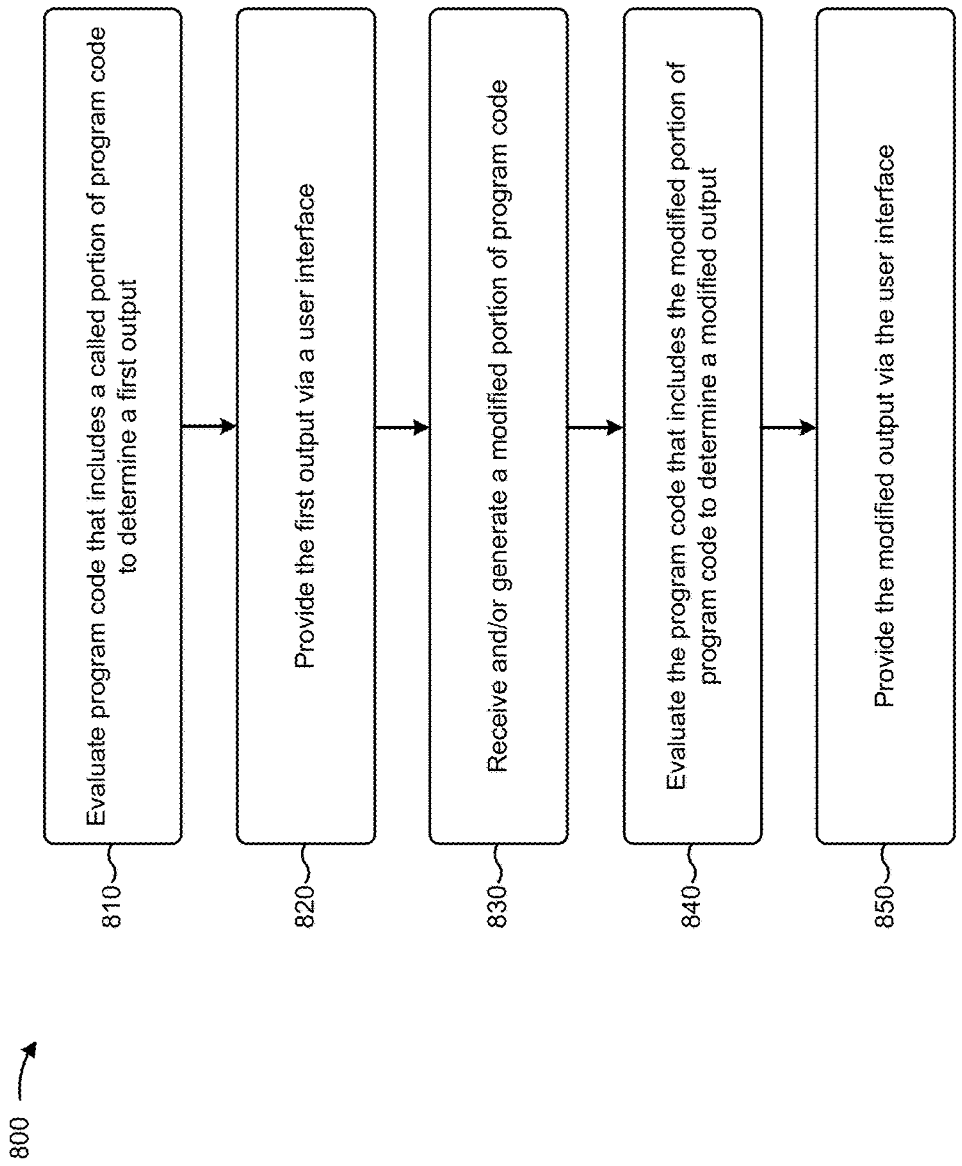
FIG. 8 is a flow chart of an example process for providing an output related to a modified portion of program code.

FIG. 8 is a flow chart of an example process 800 for providing an output related to a modified portion of program code. In some implementations, one or more process blocks of FIG. 8 may be performed by client device 210. In some implementations, one or more process blocks of FIG. 8 may be performed by another device or a group of devices separate from or including client device 210, such as server device 230 or another device.

As shown in FIG. 8, process 800 may include evaluating program code that includes a called portion of program code to determine a first output (block 810). For example, client device 210 may evaluate program code that includes a called portion of program code to determine a first output. In some implementations, client device 210 may evaluate the program code based on a user interaction. In some implementations, client device 210 may evaluate the program code to determine multiple, different first outputs. In some implementations, client device 210 may evaluate the program code by executing the program code.

In some implementations, client device 210 may evaluate a part and/or a sub-part of the program code. For example, assume that program code includes multiple, different operations and multiple, different references that call multiple, different portions of program code. Assume further that the code editor window of the user interface facilitates a user interaction to cause client device 210 to evaluate a sub-part of the program code (e.g., a particular operation of the multiple, different operations, or the like). Assume that the user causes client device 210 to evaluate the sub-part of the program code. In that case, client device 210 may evaluate only the sub-part of the program code. Client device 210 may store and/or provide an output of the sub-part of the program code. In this way, client device 210 may evaluate a sub-part of program code without evaluating the entirety of the program code, which may preserve processing resources.

In some implementations, client device 210 may evaluate a called portion of program code. For example, assume program code includes a reference that calls a particular portion of program code. Assume further that the code editor window of the user interface facilitates user interaction to cause client device 210 to evaluate the particular portion of program code. Assume that the user causes client device 210 to evaluate the particular portion of program code. In that case, client device 210 may evaluate only the particular portion of program code. Client device 210 may store and/or provide an output of the particular portion of program code. In this way, client device 210 may determine an output of the particular portion of program code without evaluating the entirety of the program code, which may preserve processing resources.

In some implementations, client device 210 may determine one or more first outputs. For example, assume that a portion of program code provides two first outputs. Assume further that a user causes client device 210 to evaluate the portion of program code. Based on evaluating the portion of program code, client device 210 may determine the two first outputs. Client device 210 may store and/or provide the two first outputs.

In some implementations, client device 210 may determine an intermediate output. For example, assume that a portion of program code determines an intermediate output, then generates a graphic based on the intermediate output. Assume further that a user causes client device 210 to evaluate the portion of program code. Based on evaluating the portion of program code, client device 210 may determine the intermediate output and/or the graphic. Client device 210 may store and/or provide the intermediate output and/or the graphic.

In some implementations, client device 210 may evaluate the program code based on a user interaction with a code evaluation window of the user interface. For example, assume that program code includes a unit test reference. Assume further that the code evaluation window of the user interface facilitates a user interaction (e.g., using a "perform test" button, or the like) to cause client device 210 to evaluate the unit test reference. Assume further that the user, by interacting with the code evaluation window of the user interface, causes client device 210 to evaluate a portion of program code called by the unit test reference. Based on the user interaction, client device 210 may evaluate the portion of program code. In this way, client device 210 may evaluate a portion of program code called by a unit test reference, which may aid in testing and/or debugging program code.

As further shown in FIG. 8, process 800 may include providing the first output via the user interface (block 820). For example, client device 210 may provide the first output via a code evaluation window of the user interface (e.g., the user interface associated with TCE 220), as shown in FIG. 4B, and by reference number 420. In some implementations, client device 210 may provide the first output based on receiving a user interaction. In some implementations, client device 210 may provide the first output based on a user interaction with a code evaluation window of the user interface (e.g., if the first output is associated with a unit test reference, client device 210 may provide the first output based on a user interaction with the code evaluation window).

In some implementations, client device 210 may provide one or more first outputs (e.g., if client device 210 determined one or more first outputs of program code, client device 210 may provide the one or more first outputs of the program code). In some implementations, client device 210 may provide an intermediate output (e.g., if client device 210 determined an intermediate output, client device 210 may provide the intermediate output). In some implementations, client device 210 may provide the intermediate output based on a user interaction (e.g., the user may cause client device 210 to provide the intermediate output).

In some implementations, client device 210 may provide an indication of an association between the program code and the first output. For example, assume that a particular operation in program code is associated with a particular output. When providing the particular output, client device 210 may provide an indicator, indicating that the particular output is associated with the particular operation (e.g., client device 210 may highlight the particular output and the particular operation, may provide for display a line indicating the association between the particular output and the particular operation, or the like). In this way, client device 210 may assist a user in determining an association between program code and a first output associated with the program code.

In some implementations, client device 210 may provide one or more first outputs related to program code that is executed in parallel. For example, assume that multiple devices, performing in parallel, execute program code. In that case, client device 210 may provide a first output associated with one or more of the multiple devices. In some implementations, client device 210 may provide information that associates the first output and the one or more devices. In some implementations, client device 210 may provide one or more first outputs related to a loop that is executed in parallel. For example, client device 210 may provide one or more first outputs, and may provide information that associates the one or more outputs with one or more devices that are executing the loop. In some implementations, client device 210 may provide one or more first outputs associated with one or more iterations of the loop. Additionally, or alternatively, client device 210 may provide information that associates a first output and a device that provides the first output. In some implementations, client device 210 may iteratively provide updated outputs as the one or more devices iteratively execute the loop. In this way, client device 210 may aid a user in understanding outputs from program code and/or loops executed in parallel.

As further shown in FIG. 8, process 800 may include receiving and/or generating a modified portion of program code (block 830). For example, client device 210 may receive and/or generate a modified portion of program code, as shown in FIG. 4D, and by reference number 440. In some implementations, client device 210 may receive the modified portion of program code via the code editor window of the user interface. Additionally, or alternatively, client device 210 may receive and/or generate the modified portion of program code based on a modified source of the portion of program code (e.g., if client device 210 or another device has generated a modified source of the portion of program code, client device 210 may receive and/or generate a modified portion of program code based on the modified source of the portion of program code).

In some implementations, client device 210 may receive modified program code via the code editor window of the user interface. For example, assume a user modifies program code, but does not modify a called portion of program code associated with the program code. In that case, client device 210 may receive the modified program code via the code editor window of the user interface. In some implementations, client device 210 may store the modified program code. In some implementations, client device 210 may provide the modified program code to another device, such as server device 230.

In some implementations, client device 210 may receive an additional portion of program code via the code editor window of the user interface. For example, assume a portion of program code defines a function that performs a first operation. Assume further that program code includes a reference that calls the portion of program code. Assume that a user modifies the portion of program code by including a second operation. Client device 210 may receive the modified portion of program code that includes the second operation.

In some implementations, client device 210 may receive a modified portion of program code that is called by multiple, different references. For example, assume that program code includes three references that call a particular source of a portion of program code. Client device 210 may receive a first modified portion of program code associated with one of the three references. In some implementations, client device 210 may receive a modified portion of program code that conflicts with another modified portion of program code. For example, assume that client device 210 receives a second modified portion of program code associated with another of the three references. Assume further that the first modified portion of program code and the second modified portion of program code are different. Client device 210 may perform an action related to the first and second modified portions of program code (e.g., may modify the particular source of the portion of program code based on both modified portions of program code, may selectively modify the particular source of the portion of program code based on one of the modified portions of program code, may provide an error message, or the like).

As further shown in FIG. 8, process 800 may include evaluating the program code that includes the modified portion of program code to determine a modified output (block 840). For example, client device 210 may evaluate the program code that includes the modified portion of program code to determine a modified output. In some implementations, client device 210 may evaluate a part of the program code, or a sub-part of the program code (e.g., client device 210 may only evaluate a sub-part of the program code that has been modified). In some implementations, client device 210 may evaluate the program code automatically. Additionally, or alternatively, client device 210 may evaluate the program code based on receiving a user interaction.

In some implementations, client device 210 may evaluate the modified portion of program code. For example, assume that the code editor window of the user interface facilitates a user interaction to cause client device 210 to evaluate the modified portion of program code. Assume that the user causes client device 210 to evaluate only the modified portion of program code. In that case, client device 210 may evaluate only the modified portion of program code. Client device 210 may store and/or provide an output of the modified portion of program code. In this way, client device 210 may evaluate the modified portion of program code without evaluating the program code, thus preserving resources.

In some implementations, client device 210 may determine a modified output. For example, if a modified portion of program code returns a modified output, client device 210 may determine the modified output by evaluating the modified portion of program code. In some implementations, client device 210 may determine an output not originally included in the portion of program code (e.g., an added output). In some implementations, client device 210 may determine an intermediate modified output (e.g., if the user modifies an operation that provides an intermediate output, client device 210 may determine the intermediate modified output).

As further shown in FIG. 8, process 800 may include providing the modified output via the user interface (block 850). For example, client device 210 may provide the modified output via the code evaluator window of the user interface (e.g., the user interface associated with TCE 220), as shown by FIG. 4E. In some implementations, client device 210 may provide an intermediate modified output (e.g., if client device 210 determined an intermediate modified output, client device 210 may provide the intermediate modified output). In some implementations, client device 210 may provide multiple, different modified outputs (e.g., if a modification to a portion of program code modifies multiple, different outputs, client device 210 may determine the multiple, different modified outputs, and may provide the multiple, different modified outputs).

In some implementations, client device 210 may provide information indicating an association between the modified output and the modified portion of program code. For example, assume that a particular operation included in a modified portion of program code is associated with a particular output. When providing the particular output, client device 210 may provide an indicator, indicating that the particular output is associated with the particular operation (e.g., client device 210 may highlight the particular output and the particular operation, may provide for display a line associating the particular output and the particular operation, or the like).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, the client device may provide a called portion of program code in-line with program code, and may receive a modification to the called portion of program code in-line with the program code. Based on the modification to the called portion of program code, the client device may modify a source of the called portion of program code, and may evaluate the program code including the modified called portion of program code. In this way, a change to a called portion of program code associated with program code may be implemented across multiple, different references that call the called portion of program code.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

User interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
- one or more instructions that, when executed by one or more processors, cause the one or more processors to:
  - provide, via a code editor window of a user interface, program code that includes a reference to external code,
    - the program code being stored in a first location, and
    - a source of the external code being stored in a second location that is different from the first location;
  - determine the external code based on the reference;
  - provide, via the code editor window of the user interface, the external code for display with the program code based on determining the external code;
  - receive a modification to the external code via the code editor window of the user interface; and
  - synchronize the modification to the external code with the source of the external code,
    - the synchronizing including one of:
      - modifying the source of the external code to generate a modified source of the external code, or
      - creating a copy of the source of the external code and modifying the copy of the source of the external code to generate a modified copy of the source of the external code.

2. The non-transitory computer-readable medium of claim 1, where the instructions further comprise:
- one or more instructions that, when executed by the one or more processors, cause the one or more processors to:
  - cause the modified source or the modified copy of the source to replace the source based on at least one of:
    - a user interaction; or
    - an origin of the source.

3. The non-transitory computer-readable medium of claim 1, where the instructions further comprise:
- one or more instructions that, when executed by the one or more processors, cause the one or more processors to:
  - evaluate the program code based on the modified source or the modified copy of the source; and
  - provide, for display, an output associated with evaluating the program code.

4. The non-transitory computer-readable medium of claim 1, where the reference is a first reference;
- where the program code is first program code; and
- where the instructions further comprise one or more instructions that, when executed by the one or more processors, cause the one or more processors to:
  - obtain second program code that includes a second reference,
    - the second reference calling the external code;
  - provide the second program code and the external code for display via the code editor window of the user interface,
    - the external code being provided based on the modified source or the modified copy of the source;
  - evaluate the second program code and the external code; and
  - provide, for display, an output associated with evaluating the second program code and the external code.

5. The non-transitory computer-readable medium of claim 1, where the instructions comprise:
- one or more instructions that, when executed by the one or more processors, cause the one or more processors to:
  - evaluate the program code to determine an output of the program code; and
  - provide, via a code evaluation window of the user interface, the output of the program code.

6. The non-transitory computer-readable medium of claim 1, where the instructions further comprise:
- one or more instructions that, when executed by the one or more processors, cause the one or more processors to:
  - receive a user interaction associated with the reference; and
  - provide the external code based on the user interaction.

7. The non-transitory computer-readable medium of claim 1,
- where the program code includes an input; and
- where the instructions further comprise one or more instructions that, when executed by the one or more processors, cause the one or more processors to:
  - provide, in association with the program code and via the code editor window of the user interface, the input.

8. A method, comprising:
- obtaining program code that includes a reference to external code,
  - the program code being stored in a first location,
  - a source of the external code being stored in a second location that is different from the first location, and the obtaining the program code being performed by a device;

determining, based on the source of the external code, the external code, the determining the external code being performed by the device;

providing, for display, the external code with the program code based on determining the external code, the providing the external code with the program code being performed by the device;

determining that the external code has been modified, the determining that the external code has been modified being performed by the device; and synchronizing, based on determining that the external code has been modified, the external code with the source of the external code, the synchronizing including one of:

modifying the source of the external code to generate a modified source of the external code, or creating a copy of the source of the external code and modifying the copy of the source of the external code to generate a modified copy of the source of the external code.

9. The method of claim 8, where the external code includes an intermediate input and determines an intermediate output, and where the method further comprises:

providing the intermediate input and the intermediate output for display in association with the external code; and providing, for display, an indicator of an association between the intermediate input and the intermediate output.

10. The method of claim 8, further comprising:

determining a unit test reference based on a first user interaction, the unit test reference being associated with a particular line of the program code, and the unit test reference calling a unit test, the unit test testing the particular line of the program code; and executing the unit test reference, the executing causing the device to indicate a test result of executing the particular line of the program code.

11. The method of claim 10, where executing the unit test reference fails to execute the particular line of the program code, and where the method further comprises:

providing an indication that the unit test reference failed to execute the particular line of the program code.

12. The method of claim 8, where the method further comprises:

receiving an instruction that instructs the device to store the modified source of the external code or the modified copy of the source of the external code; and storing, locally, the modified source of the external code or the modified copy of the source of the external code, based on the instruction.

13. The method of claim 8, further comprising:

receiving other program code that includes another reference, the other reference calling the external code;

determining a modified portion of program code based on the modified source or the modified copy of the source;

evaluating the other program code and the external code to determine an output; and providing the output.

14. The method of claim 8, where the method further comprises:

causing the modified source or the modified copy of the source to replace the source based on one of a user interaction or an origin of the source.

15. A device, comprising:

one or more processors to:

provide, via a code editor window of a user interface, program code that includes a reference to external code, the program code being stored in a first location, and a source of the external code being stored in a second location that is different from the first location;

determine the external code based on the reference;

provide, via the code editor window of the user interface, the external code for display with the program code based on determining the external code;

determine that the external code has been modified via the code editor window of the user interface, the external code being modified to create modified external code; and synchronize the modified external code with the source of the external code, the synchronizing including one of:

modifying the source of the external code to generate a modified source of the external code, or creating a copy of the source of the external code and modifying the copy of the source of the external code to generate a modified copy of the source of the external code.

16. The device of claim 15, where the one or more processors are further to:

receive a user interaction indicating that the source of the external code is to be replaced; and replace the source of the external code with the modified source of the external code based on the user interaction.

17. The device of claim 15, where the external code provides an intermediate output; and where the one or more processors are further to:

determine the intermediate output; and provide, for display and in association with the program code, the intermediate output, the intermediate output being provided for display via a code evaluation window of the user interface.

18. The device of claim 15, where the reference is received based on a user input, the user input specifying the first location of the program code to associate with the reference, and the external code being associated with a different file than the program code.

19. The device of claim 15, where the one or more processors are further to:

provide additional program code that includes a first reference and a second reference, the first reference and the second reference calling the external code, and the first reference being separate from the second reference in the additional program code; and execute the external code to determine the reference; and provide information identifying the reference, the reference being provided in association with the first reference and the second reference.

20. The device of claim 15, where the one or more processors are further to:

cause the modified source or the modified copy of the source to replace the source based on one of a user interaction or an origin of the source.

* * * * *